US009712207B2

United States Patent
Rudershausen

(10) Patent No.: US 9,712,207 B2
(45) Date of Patent: Jul. 18, 2017

(54) METHOD AND DECODER FOR DESPREADING DATA SIGNALS SPREAD USING WALSH SEQUENCES

(71) Applicant: Reinhart Rudershausen, Schondorf am Ammersee (DE)

(72) Inventor: Reinhart Rudershausen, Schondorf am Ammersee (DE)

(*) Notice: Subject to any disclaimer, the term of this patent is extended or adjusted under 35 U.S.C. 154(b) by 198 days.

(21) Appl. No.: 14/577,899

(22) Filed: Dec. 19, 2014

(65) Prior Publication Data

US 2015/0162950 A1 Jun. 11, 2015

Related U.S. Application Data

(63) Continuation-in-part of application No. 14/117,015, filed as application No. PCT/EP2012/058637 on May 10, 2012, now abandoned.

(30) Foreign Application Priority Data

May 11, 2011 (DE) .................. 10 2011 075 650

(51) Int. Cl.
*H04B 1/7093* (2011.01)
*H04J 13/00* (2011.01)

(52) U.S. Cl.
CPC ........ *H04B 1/7093* (2013.01); *H04J 13/0048* (2013.01)

(58) Field of Classification Search
CPC ....... H04B 1/707; G01S 19/24; G01S 19/246; G01S 19/30
See application file for complete search history.

(56) References Cited

U.S. PATENT DOCUMENTS

| | | | |
|---|---|---|---|
| 8,174,440 B2* | 5/2012 | Terashima | G01S 19/246 342/357.63 |
| 2010/0128660 A1 | 5/2010 | Becker et al. | |
| 2010/0158076 A1 | 6/2010 | Snlyely et al. | |
| 2014/0369176 A1 | 12/2014 | Rudershausen | |

FOREIGN PATENT DOCUMENTS

| | | |
|---|---|---|
| DE | 19717546 A1 | 6/1998 |
| DE | 102009014480 A1 | 10/2010 |
| EP | 1311095 A1 | 4/2001 |
| EP | 1726114 B1 | 11/2006 |
| WO | 2006/099934 A1 | 9/2006 |

(Continued)

OTHER PUBLICATIONS

Farley, D.T., "On-line data processing techniques for MST radars," *Radio Science* vol. 20, No. 6 (1985): pp. 1177-1184.

(Continued)

*Primary Examiner* — Chandrahas Patel
(74) *Attorney, Agent, or Firm* — Kilpatrick Townsend & Stockton LLP

(57) ABSTRACT

According to the invention, a data stream with continuous, periodic transmitted, spread data signals of N chips each is split into two data streams of N chips each, which are shifted by N chips; for each of these data streams the correlation functions are calculated within every chip clock time and, in relation to their maxima, evaluated in order to separate user signals from extraneous signals and disturbing signals.

21 Claims, 29 Drawing Sheets

(56) References Cited

FOREIGN PATENT DOCUMENTS

WO     2010/008823 A2     1/2010
WO     2010/108823 A1     9/2010

OTHER PUBLICATIONS

Foster, S., "Impulse Response Measurement Using Golay Codes," *Institute of Electrical and Electronic Engineers: International Conference on Acoustics, Speech & Signal Processing.* Tokyo, vol. 4 (Apr. 1986): pp. 929-932.
Golay, M.J.E., "Complementary Series, " *IRE Transactions on Information Theory* vol. 7 (1961): pp. 82-87.
Hussain, M.G., "Principles of High-Resolution Radar Based on Nonsinusoidal Waves—Part 1: Signal Representation and Pulse Compression," *Institute of Electrical and Electronic Engineers Transaction on Electromagnetic Compatibility* vol. 31, No. 4 (1989): pp. 359-368.
International Search Report and Written Opinion for PCT/EP2012/058637 filed May 10, 2012: pp. 1-8.
Darnell, M., et al., "Synthesis of multilevel complementary sequences." Electronics Letters, Institute of Electrical and Electronic Engineers, vol. 24, No. 19 (1988): pp. 1251-1252.
Sarwate, D. V., et al., "Crosscorrelation Properties of Pseudorandom and Related Sequences." Proceedings of the institute of Electrical and Electronic Engineers, vol. 68, No. 5 (1980): pp. 593-619.

\* cited by examiner

|  | Time Axis (Shift in Amount of Sub-pulses τ) | | | | | | | | | | | | | | |
| --- | --- | --- | --- | --- | --- | --- | --- | --- | --- | --- | --- | --- | --- | --- | --- |
|  | $t_{15}$ | $t_{14}$ | $t_{13}$ | $t_{12}$ | $t_{11}$ | $t_{10}$ | $t_9$ | $t_8$ | $t_7$ | $t_6$ | $t_5$ | $t_4$ | $t_3$ | $t_2$ | $t_1$ |
| Correlation sums |  |  |  |  |  |  |  |  |  |  |  |  |  |  |  |
| AW(3,1) / AW(3,1) | 0 | 0 | 0 | 0 | 0 | 0 | 0 | 32 | 0 | 0 | 0 | 0 | 0 | 0 | 0 |
| AW(3,1) / AW(3,3) | 0 | 0 | 0 | 0 | 0 | 0 | 0 | 0 | 0 | 0 | 0 | 0 | 0 | 0 | 0 |
| AW(3,1) / AW(3,5) | 0 | 0 | 0 | 0 | 0 | 0 | 0 | 0 | 0 | 0 | 0 | 0 | 0 | 0 | 0 |
| AW(3,1) / AW(3,7) | 0 | 0 | 0 | 0 | 0 | 16 | 0 | 0 | 0 | 16 | 0 | 0 | 0 | 0 | 0 |
|  |  |  |  |  |  |  |  |  |  |  |  |  |  |  |  |
| AW(3,3) / AW(3,1) | 0 | 0 | 0 | 0 | 0 | 0 | 0 | 0 | 0 | 0 | 0 | 0 | 0 | 0 | 0 |
| AW(3,3) / AW(3,3) | 0 | 0 | 0 | 0 | 0 | 0 | 0 | 32 | 0 | 0 | 0 | 0 | 0 | 0 | 0 |
| AW(3,3) / AW(3,5) | 0 | 0 | 0 | 0 | 0 | -16 | 0 | 0 | 0 | -16 | 0 | 0 | 0 | 0 | 0 |
| AW(3,3) / AW(3,7) | 0 | 0 | 0 | 0 | 0 | 0 | 0 | 0 | 0 | 0 | 0 | 0 | 0 | 0 | 0 |
|  |  |  |  |  |  |  |  |  |  |  |  |  |  |  |  |
| AW(3,5) / AW(3,1) | 0 | 0 | 0 | 0 | 0 | 0 | 0 | 0 | 0 | 0 | 0 | 0 | 0 | 0 | 0 |
| AW(3,5) / AW(3,3) | 0 | 0 | 0 | 0 | 0 | -16 | 0 | 0 | 0 | -16 | 0 | 0 | 0 | 0 | 0 |
| AW(3,5) / AW(3,5) | 0 | 0 | 0 | 0 | 0 | 0 | 0 | 32 | 0 | 0 | 0 | 0 | 0 | 0 | 0 |
| AW(3,5) / AW(3,7) | 0 | 0 | 0 | 0 | 0 | 0 | 0 | 0 | 0 | 0 | 0 | 0 | 0 | 0 | 0 |
|  |  |  |  |  |  |  |  |  |  |  |  |  |  |  |  |
| AW(3,7) / AW(3,1) | 0 | 0 | 0 | 0 | 0 | 16 | 0 | 0 | 0 | 16 | 0 | 0 | 0 | 0 | 0 |
| AW(3,7) / AW(3,3) | 0 | 0 | 0 | 0 | 0 | 0 | 0 | 0 | 0 | 0 | 0 | 0 | 0 | 0 | 0 |
| AW(3,7) / AW(3,5) | 0 | 0 | 0 | 0 | 0 | 0 | 0 | 0 | 0 | 0 | 0 | 0 | 0 | 0 | 0 |
| AW(3,7) / AW(3,7) | 0 | 0 | 0 | 0 | 0 | 0 | 0 | 32 | 0 | 0 | 0 | 0 | 0 | 0 | 0 |

|  | i1 | i2 | i3 | i4 | i5 | i6 | i7 | i8 | i9 | i10 | i11 | i12 | i13 | i14 | i15 |
|---|---|---|---|---|---|---|---|---|---|---|---|---|---|---|---|
| Received signal W(3,2)shift1: | | | | | | | | | | | | | | | |
| AKF(W(3,2)/W(3,2))shift1 | -1 | -2 | -3 | -2 | 1 | 4 | 7 | 5 | 2 | -1 | -4 | -3 | -2 | -1 | 0 |
| Created signal AW(3,2)shift1: | | | | | | | | | | | | | | | |
| AKF(AW(3,2)/AW(3,2))shift1 | 1 | 0 | -1 | 4 | -1 | -2 | 7 | -1 | 0 | 3 | 0 | 1 | 0 | 1 | 0 |
| W(3,2)/W(3,2)^AW(3,2)/ AW(3,2)shift1 | 0 | 0 | 0 | 0 | 0 | 0 | 7 | 0 | 0 | 0 | 0 | 0 | 0 | 0 | 0 |
| Complementary signal W'(3,2)shift1: | | | | | | | | | | | | | | | |
| AKF(W'(3,2)/W'(3,2))shift1 | 1 | -2 | 3 | -2 | -1 | 4 | -7 | 5 | -2 | -1 | 4 | -3 | 2 | -1 | 0 |
| Complementary signal AW'(3,2)shift1: | | | | | | | | | | | | | | | |
| AKF(AW'(3,2)/AW'(3,2))shift1 | -1 | 0 | 1 | 4 | 1 | 2 | -7 | -1 | 0 | 3 | 0 | 1 | 0 | 1 | 0 |
| W'(3,2)/W'(3,2)^AW'(3,2)/ AW'(3,2)shift1 | 0 | 0 | 0 | 0 | 0 | 0 | -7 | 0 | 0 | 0 | 0 | 0 | 0 | 0 | 0 |
| ΣAKFs(received + complementary signals)shift1 | 0 | 0 | 0 | 0 | 0 | 0 | 0 | 0 | 0 | 0 | 0 | 0 | 0 | 0 | 0 |
| | | | | | | | | | | | | | | | |
| Reversed, received signal W(3,2)revshift1 | | | | | | | | | | | | | | | |
| AKF(W(3,2)rev/W(3,2)rev)shift1 | 0 | -1 | -2 | -3 | -4 | -1 | 2 | 5 | 7 | 4 | 1 | -2 | -3 | -2 | -1 |
| Reversed, created signal AW(3,2)revshift1: | | | | | | | | | | | | | | | |
| AKF(AW(3,2)rev/AW(3,2)rev)shift1 | 0 | 1 | 0 | 1 | 0 | 3 | 0 | -1 | 7 | -2 | -1 | 4 | -1 | 0 | 1 |
| W(3,2)rev/W(3,2)rev ^ AW(3,2)rev/AW(3,2)revshift1 | 0 | 0 | 0 | 0 | 0 | 0 | 0 | 0 | 7 | 0 | 0 | 0 | 0 | 0 | 0 |
| Reversed, complementary signal W'(3,2)revshift1: | | | | | | | | | | | | | | | |
| AKF(W'(3,2)rev/W'(3,2)rev)shift1 | 0 | -1 | 2 | -3 | 4 | -1 | -2 | 5 | -7 | 4 | -1 | -2 | 3 | -2 | 1 |
| Reversed, complementary signal AW'(3,2)revshift1: | | | | | | | | | | | | | | | |
| AKF(AW'(3,2)rev/ AW'(3,2)rev)shift1 | 0 | 1 | 0 | 1 | 0 | 3 | 0 | -1 | -7 | -2 | 1 | 4 | 1 | 0 | -1 |
| W'(3,2)rev/W'(3,2)rev ^ AW'(3,2)rev/AW'(3,2)revshift1 | 0 | 0 | 0 | 0 | 0 | 0 | 0 | 0 | -7 | 0 | 0 | 0 | 0 | 0 | 0 |
| ΣAKFrev(received + complementary signals)shift1 | 0 | 0 | 0 | 0 | 0 | 0 | 0 | 0 | 0 | 0 | 0 | 0 | 0 | 0 | 0 |
| ΣAKFs shift1 × ΣAKFs revshift1 | 0 | 0 | 0 | 0 | 0 | 0 | 0 | 0 | 0 | 0 | 0 | 0 | 0 | 0 | 0 |

Fig. 19A

Fig. 20A $$1 \quad 1 \quad 1 \quad 1 \quad \boxed{-1 \quad -1 \quad -1 \quad -1 \quad 1 \quad 1 \quad 1 \quad 1} \quad -1 \quad -1 \quad -1 \quad -1 \quad W(3,2)$$

$$1 \quad 1 \quad \boxed{-1 \quad -1 \quad -1 \quad -1 \quad 1 \quad 1 \quad 1 \quad 1} \quad -1 \quad -1 \quad -1 \quad -1 \quad 1 \quad 1 \quad W(3,3)$$

Table 1

1 1 1 1 -1 -1 -1 -1 1 1 1 1 -1 -1 -1 -1   W(3,2)

1 1 -1 -1 -1 -1 1 1 1 1 -1 -1 -1 -1 1 1   W(3,3)

Table 8. Time-shifted, periodic cross-correlation W(3,2)/W(3,3)

| W(3,2)/W(3,3) | Time axis (shift in the correlation block) | | | | | | | | | | | | | | | Chip clock |
|---|---|---|---|---|---|---|---|---|---|---|---|---|---|---|---|---|
| | t15 | t14 | t13 | t12 | t11 | t10 | t9 | t8 | t7 | t6 | t5 | t4 | t3 | t2 | t1 | |
| | 0 | 0 | 0 | 0 | 0 | 0 | 0 | 0 | 0 | 0 | 0 | 0 | 0 | 0 | 0 | t1 |
| | 0 | 0 | 0 | 2 | 0 | -2 | 0 | -4 | 0 | -2 | 0 | 2 | 0 | 0 | 0 | t2 |
| | 0 | 0 | 0 | 4 | 0 | 0 | 0 | -8 | 0 | 0 | 0 | 4 | 0 | 0 | 0 | t3 |
| | 0 | 0 | 0 | 0 | 0 | 0 | 0 | -4 | 0 | 0 | 0 | 0 | 0 | 0 | 0 | t4 |
| | 0 | 0 | 0 | 0 | 0 | 0 | 0 | 0 | 0 | 0 | 0 | 0 | 0 | 0 | 0 | t5 |
| | 0 | 0 | 0 | -6 | 0 | 0 | 0 | 12 | 0 | 0 | 0 | -6 | 0 | 0 | 0 | t6 |
| | 0 | 0 | 0 | 0 | 0 | 0 | 0 | 24 | 0 | 0 | 0 | 0 | 0 | 0 | 0 | t7 |
| | 0 | -2 | 0 | 0 | 0 | 2 | 0 | 12 | 0 | 2 | 0 | 0 | 0 | -2 | 0 | t8 |
| | 0 | 0 | 0 | 0 | 0 | 0 | 0 | 0 | 0 | 0 | 0 | 0 | 0 | 0 | 0 | t9 |
| | 0 | 0 | 0 | 6 | 0 | 0 | 0 | -12 | 0 | 0 | 0 | 6 | 0 | 0 | 0 | t10 |
| | 0 | 0 | 0 | 0 | 0 | 0 | 0 | -24 | 0 | 0 | 0 | 0 | 0 | 0 | 0 | t11 |
| | 0 | 0 | 0 | 0 | 0 | 0 | 0 | -12 | 0 | 0 | 0 | 0 | 0 | 0 | 0 | t12 |
| | 0 | 0 | 0 | 0 | 0 | 0 | 0 | 0 | 0 | 0 | 0 | 0 | 0 | 0 | 0 | t13 |
| | 0 | 0 | 0 | -2 | 0 | 0 | 0 | 4 | 0 | 0 | 0 | -2 | 0 | 0 | 0 | t14 |
| | 0 | 0 | 0 | 0 | 0 | 0 | 0 | 8 | 0 | 0 | 0 | 0 | 0 | 0 | 0 | t15 |
| | 0 | -2 | 0 | 0 | 0 | 2 | 0 | 4 | 0 | 2 | 0 | 0 | 0 | -2 | 0 | t16 |
| | 0 | 0 | 0 | 0 | 0 | 0 | 0 | 0 | 0 | 0 | 0 | 0 | 0 | 0 | 0 | t17 |

Table 9

FIG. 26

Table 10

METHOD AND DECODER FOR DESPREADING DATA SIGNALS SPREAD USING WALSH SEQUENCES

CROSS-REFERENCE TO RELATED APPLICATIONS

The present application is a continuation-in-part of U.S. patent application Ser. No. 14/117,015, entitled "METHOD AND DECODER FOR DESPREADING DATA SIGNALS SPREAD USING WALSH SEQUENCES," filed on Dec. 10, 2013, which is a national stage entry application of PCT/EP2012/058637, filed May 10, 2012, entitled "METHOD AND DECODER FOR DESPREADING DATA SIGNALS SPREAD USING WALSH SEQUENCES". The entire disclosures of the above applications are hereby incorporated by reference, for all purposes, as if fully set forth herein.

The invention comprises a method and a decoder for the de-spreading of a data signal spread with a Walsh sequence.

With data transmission systems that utilize multiple access code division, as for example cdma2000, UMTS, GPS, RFID, WIFI and WiMAX, several subscribers are able to simultaneously transmit data via one transceiver channel. In order to avoid collisions, the transmitter spreads the data signals of each single subscriber with distinct spreading sequences (i.e. coding by a spread spectrum code, or rather by a code sequence), which enable the precise identification of a specific subscriber channel. By using the spread spectrum method for data signals, the entire system bandwidth can be utilized, i.e. the usable bandwidth for each single subscriber is increased within the frequency domain. Spreading factors between 10 and 1000 are applied in practical systems.

One advantage of this method is the low susceptibility against the effects of multi-path propagation. Because of the high transmission bandwidth, only a small part of the occupied spectrum is influenced by the frequency-selective Rayleigh fading, such that the typical signal reductions are considerably less than within narrow band systems. Another advantage is the reduction of the power spectrum by the spreading procedure. Hence, communication even below the noise level is enabled. Further advantages are the minor influence of jamming signals of different sources (anti-jamming), including intra channel interference (anti-interference) from other subscribers, and the effect of the spreading sequence as scrambling code since the message in the receiver can only be detected if the spreading code is known.

With the spread spectrum technique the data signal to be transmitted is spread over an enlarged spectrum area by a spreading sequence, e.g. a pseudonoise sequence (PN-sequence). After modulation onto the radio frequency carrier, the data signal, now spread, is transmitted, e.g. emitted from an antenna. The receiver demodulates the spread data signal and then performs a despreading with a spreading signal which is synchronous to the transmitter.

The receiver does not only receive the spread data signal from the requested subscriber but also additional spread data signals from other subscribers, which transmit in the same frequency range. Through the despreading process in the receiver though, only that data signal, which uses the same and synchronous spreading sequence as the transmitter, is despread. After despreading, the requested data signal can be filtered out easily by means of a matched filter ("Matched Filter", refer to J. G. Proakis, M. Salehi, Grundlagen der Kommunikationstechnik, Pearson Studium, Munchen, 2004, p. 793-797).

The filter for spreading sequences can be described by the autocorrelation (AKF) and cross-correlation function (KKF). This AKF can be formed for discrete functions through an autocorrelation sum ($AKF_k$) and represents the statistical relationship of the elements of a sequence $X_i$ (k) with N elements:

$$AKF_k = \sum_{i=0}^{N-1-k} X_i X_{i+k} \qquad \text{Equation (1)}$$

where the index k indicates the relative runtime shift of the spreading sequence between each other during the transmission (shift in amounts of sub-pulses T when calculating the correlation; $0 \le k \le N-1$); only when k=0 does the autocorrelation result in a value unequal to zero—assuming ideal conditions without interferences and with synchronous reception—which then just corresponds directly to the data signal. Other values, so called sidelobes, then do not arise during de-spreading.

Spreading sequences exist with nearly ideal periodic AKFs, e.g. the msequences and Gold sequences. A periodic AKF is a correlation function AKF that results if the spread data signals are received in periodical order immediately following each other.

However, the periodic autocorrelation property of a spreading sequence is not the only relevant attribute for the spread spectrum technique in case of asynchronous reception, i.e. when there exists an unknown time shift of the spread data signals between each other. For applications in Code Division Multiple Access systems (CDMA systems) with asynchronous reception the aperiodic autocorrelation and cross-correlation characteristics are also of great interest. The interference between two differently spread data signals is proportional to the scalar product P $$P = \sum_{i=0}^{i=N-1} X_i Y_i \qquad \text{Equation (2)}$$

of both spreading sequences $X_i$, $Y_i$. Hence spreading sequences should be at least orthogonal, which means that their scalar product P is zero. However, orthogonality alone is not sufficient for applications where the spreading sequences are not synchronously transmitted or when large signal time delays arise from multipath propagation. In these cases the scalar product shifted by the delay τ, i.e. the cross-correlation function (KKF), must also be minimized.

Definitions for periodic and aperiodic cross-correlations are known from D. E. Sarwate, M. B. Pursley, Crosscorrelation Properties of Pseudorandom Sequences and Related Sequences, Proc. Of the IEEE, vol. 68, no. 5, May 1980, pp. 593-619.

The KKF is therefore a measure for the applicability of different sequences $X_i(k)$ and $Y_j(k)$ in Code Division Multiple Access systems and can be built for discrete functions via the cross-correlation sum ($KKF_k$):

$$KKF_k = \sum_{i=0}^{N-1-k} X_i Y_{i+k} \qquad \text{Equation (3)}$$

The lower the cross-correlation values of the spreading sequences of different user signals are, the fewer the interferences and the more users that are able to participate in Code Division Multiple Access.

In multicarrier systems using the CDMA method, the high values of the cross-correlation reduce the signal to noise ratio in front of the decoder, which in turn limits the maximum amount of subscribers. In addition, if the amplitude of the spread data signal of the subscribers widely varies, the non-ideal cross-correlation properties of a spreading sequence can cause the requested signal to be covered in the receiver through the other spread data signals, and thus will not be detected (near-far effect).

DE 197 17 546 A1 discloses a method and an apparatus for decoding and for demodulating the received signal in a CDMA transmission system which is specified in serial code chaining. There, a two step coding on the transmitter side of the transmission system is comprised of external and internal coding. The internal coding is an orthogonal multi-step modulation with Walsh functions, whereas the external coding consists of an error correcting code.

A disadvantage by applying such a system for the transmission of spread data signals arises in the fact that, for error correction of the transmission, a second signal has to be transmitted. This reduces the available bandwidth and is arithmetically very sophisticated.

EP 1 311 095 B1 discloses the application of pairs of Golay sequences for spread spectrum modulation. Binary input data are spread with η pairs of complementary Golay sequences according to the described method, and these pairs are transmitted via an apparatus for digital communication. When being received, the so-created sequences are folded by correlation with the η pairs of complementary Golay sequences, while the results of the folding related corresponding to equal pairs of Golay sequences are added in order to get η data streams.

EP 1 726 114 B1 also discloses the application of pairs of Golay sequences for spread spectrum modulation. However, here only one of the Golay sequences of a pair has to be transmitted since the respective complementary sequence is generated on the receiver side.

Golay sequences are sequence pairs with the advantageous property that their phase-shifted aperiodic autocorrelation coefficients add up to zero. In this way the disturbing sidelobes in the autocorrelation function are avoided.

One disadvantage of the spread spectrum modulation with pure Golay sequences results from the fact that only a few pairs exist for a certain sequence length. Therefore, a multicarrier transmission of many spread data signals is limited through the small size of the sequence family, which is required for spread spectrum coding. Furthermore, they do have orthogonal characteristic having a zero with shift $\tau=0$; however, with shifts $\tau>0$ the cross-correlation between different Golay sequences shows disturbing sidelobes.

To overcome this restriction, EP 1 726 114 B1 discloses the additional transition to complex-valued sequences with the application of DPSK (differential phase shift keying).

But this is very complex since, not only a second completely different modulation scheme with additional procedural steps is required, but also additional hardware components are necessary.

WO 2010/108823 discloses a method and a decoder enabling the downstream decoding of data signals spread with Walsh sequences which are transmitted with multiple other data signals on the same bandwidth of a data connection with simple technical means. This occurs without resulting in disturbing cross-talk or other diminishing factors on single data signals through the other data signals.

Applying the method according to FIG. 10 of WO 2010/108823 in periodic manner delivers the ideal Dirac pulse in perfect synchronous transmission. However, there arise suboptimum effects if asynchronous neighbor channel signals or extraneous signals are superposed. For example, through a time delay of two chips the Walsh Sequence W(3,2) within continuous, periodic transmission will be transformed into W(3,3), as illustrated in FIG. 21.

If there is no synchronization within the transmission link (as e.g. within the UMTS uplink), then this leads to disturbances in the separation from other subscriber's signals.

The task of this invention is to present a further improved method for de-spreading of data signals which are spread by Walsh sequences as well as presenting a corresponding decoder.

This task is solved by the invention as defined in the claims 1 and 4. Advantageous implementations are defined in the dependant claims.

According to the invention, a data stream with continuous, periodic transmitted, spread data signals of N chips each is split into two data streams of N chips each, which are shifted by N chips; for each of these data streams the correlation functions are calculated within every chip clock time and, in relation to their maxima, evaluated in order to separate user signals from extraneous signals and disturbing signals. The received spread data signals can be decoded with minor technical effort as well as less disturbing crosstalk or other impairments of the data signals through the other, particularly asynchronously incoming data signals are removed.

The method subject to the invention can be simply integrated as a software or hardware module into the existing transmission system.

The method of the invention uses the improved correlation properties and methods known from WO 2010/108823. The correlation properties of the transmitted data signals are improved to the optimum. The sum of the autocorrelation functions as well as of the cross-correlation functions of the spread data signals no longer show sidelobes.

The correlation properties of the transmitted spread signals are improved to the optimum in accordance with the invention's method. The auto- as well as the cross-correlation summations of the spread spectrum data signals show zero sidelobes or at least fewer and lower sidelobes as without the method.

Without the invention's method, some of the Walsh sequences applied in CDMA systems as signature sequences produce a poor aperiodic AKF and high values of KKF; moreover, the orthogonality is already lost with small synchronization errors or errors through signal distortion or multipath propagation. The invention presented herein eliminates this disadvantage.

With asynchronous reception—i.e. in case of an unknown relative time shift between the different spread spectrum sequences—the method according to the invention detects the spread signal from noise substantially better and it can be filtered out more easily from noise or noise signals or intra channel interference. Therefore the new method can be applied not only to the downlink but also to the uplink of a mobile radio system, e.g. within UMTS which already applies Walsh—and OVFS (orthogonal variable frequency sequences) sequences, as an improvement on the receiver side, and increasing the practically achievable subscriber quantity per cell into the direction of the theoretical full system load—i.e. N subscribers simultaneously with N spread spectrum sequences.

The increase of the user quantity and/or the increase of the range or the decrease of the transmitter power is also enabled for synchronous detection within digital communication systems.

Also, the transition of the spread spectrum method applied up to now to complex-valued sequences with the according additional expense can be avoided simply by taking advantage of the internal properties of orthogonal binary sequences, as for example Walsh sequences, or orthogonal Golay-Walsh sequences. Nevertheless, since the sequences remain binary, the well-known higher complex-valued modulation schemes, like for example ¼-QPSK, 8-phase shift keying can be used for the usual purposes of increasing the data rate.

Examples of invention's embodiments of the invention will now be described in more detail.

BRIEF DESCRIPTION OF THE DRAWINGS

FIG. 5 shows a tabular depiction of the sum of the autocorrelation sums KKF1 to KKF4 of AW(3,1) and the cross-correlation sums KKF1 to KKF4 between AW(3,1) and respectively AW(3,3), AW(3,5) and AW(3,7) from the method's first embodiment in FIG. 1.

FIG. 15A illustrates the results of the improved symmetry test in accordance with equation (9a) applied to the auto-correlations W(3,2)/W(3,2) of a synchronized incoming Walsh sequence W(3,2) at different chip shifts ti, according to an embodiment.

FIG. 19A shows a tabular depiction of the results of correlations between the received Walsh sequence W(3,2) of time shift t1 and the created Golay-Walsh sequence AW(3,2) together with the respective results of correlations of complementary W(3,2)' and AW(3,2)' sequences as well as the results of correlations of the corresponding reversed sequences as explained with reference to FIGS. 18A and 18B.

FIG. 20A shows a tabular depiction of the results of cross-correlations between the received Walsh code sequence W(3,7) of time shift t1 and the Walsh sequence W(3,3) and the results of cross-correlations with the corresponding Golay-Walsh code sequence AW(3,3), the complementary W(3,3)' and AW(3,3)', and reversed results of cross-correlations with the W(3,3) and AW(3,3) sequences as explained with reference to—FIG. 18, according to an embodiment.

FIG. 23 is a table depicting example Golay-Walsh sequences.

FIG. 26 is a table of a decoder result.

As in WO 2010/108823 this invention only uses Walsh functions for the spreading of the data signals S.

The Walsh functions will be designated as W(n,m) in the following where n designates the order of the used Walsh function family (with $2^n$=N elements designated as chips, i.e. the number of binary elements transmitted in the spread data signal; m designates the respective Walsh function out of the $2^n$=N existing Walsh functions ($1 \leq m \leq 2^n$). The Walsh functions are applied for spreading of signature sequences for the separation of user channels as well as for high-level orthogonal modulation. The higher-level orthogonal modulation offers the advantages of increasing the user bit rate by the factor of n and a lower bit error rate.

Walsh functions have the advantage that they are strictly orthogonal.

In an example of a Walsh function family of order 3, eight users ($2^3$) can be perfectly separated since Walsh sequences are strictly orthogonal. Therefore Walsh sequences are suitable e.g. for the downlink of a mobile system as far as it is synchronous and there is no frequency selective channel. However, this synchronicity is not valid for the uplink of a code division multiple access system, since the signals of the locally-distributed users reach the base station with different delay times, such that—also under non-selective channels—the orthogonal property of the Walsh sequences gets lost.

The majority of the values of the cross-correlated pairs are in the range of PN sequences. The values of the pairs W(3,3)/W(3,6) and W(3,4)/W(3,5) are extremely bad. The maximum of the KKF in the latter case reaches nearly the maximum value of the AKF with N−1=7 with a minor shift of τ; with that, no safe user separation can be achieved under asynchronous circumstances. The widths of the AKF in the cases of the codes W(3,1) and W(3,8) are also unfavorable, whereby no suppression of neighboring channel echoes is possible within frequency-selective channels. The AKF and KKF values of higher order Walsh sequences with sequence length 32 or higher are similarly unsatisfactory.

Therefore under frequency-selective conditions, the Walsh functions cannot be used as single user codes in the downlink; in addition, the code division multiple access signals are multiplied by a PN code to suppress the co-channel cross-talk. With that, the gradual diminishing of the quality (graceful degradation) is perceived only as noise during increasing multiple-user interference.

The present invention uses in the decoder for de-spreading stored Golay-Walsh sequences as spread spectrum sequences S according to WO 2010/108823. Golay-Walsh sequences result through multiplying a Golay sequence with a Walsh sequence. These spread spectrum sequences will be designated as AW(n,m) in the following, analogous to the Walsh function W(n,m).

Figures 21, 22:
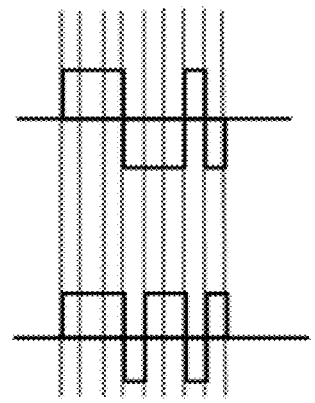
FIG. 21 is a figure showing two Walsh Sequences.
FIG. 22 is a figure showing a pair of complementary Golay sequences.

To illustrate the formation of Golay-Walsh sequences, the pair of complementary Golay sequences, illustrated in FIG. 22, of length 8 is used, e.g. with eight chips whereby t designates the point of time at which the respective chip arrives at a decoder.

Figure 23:
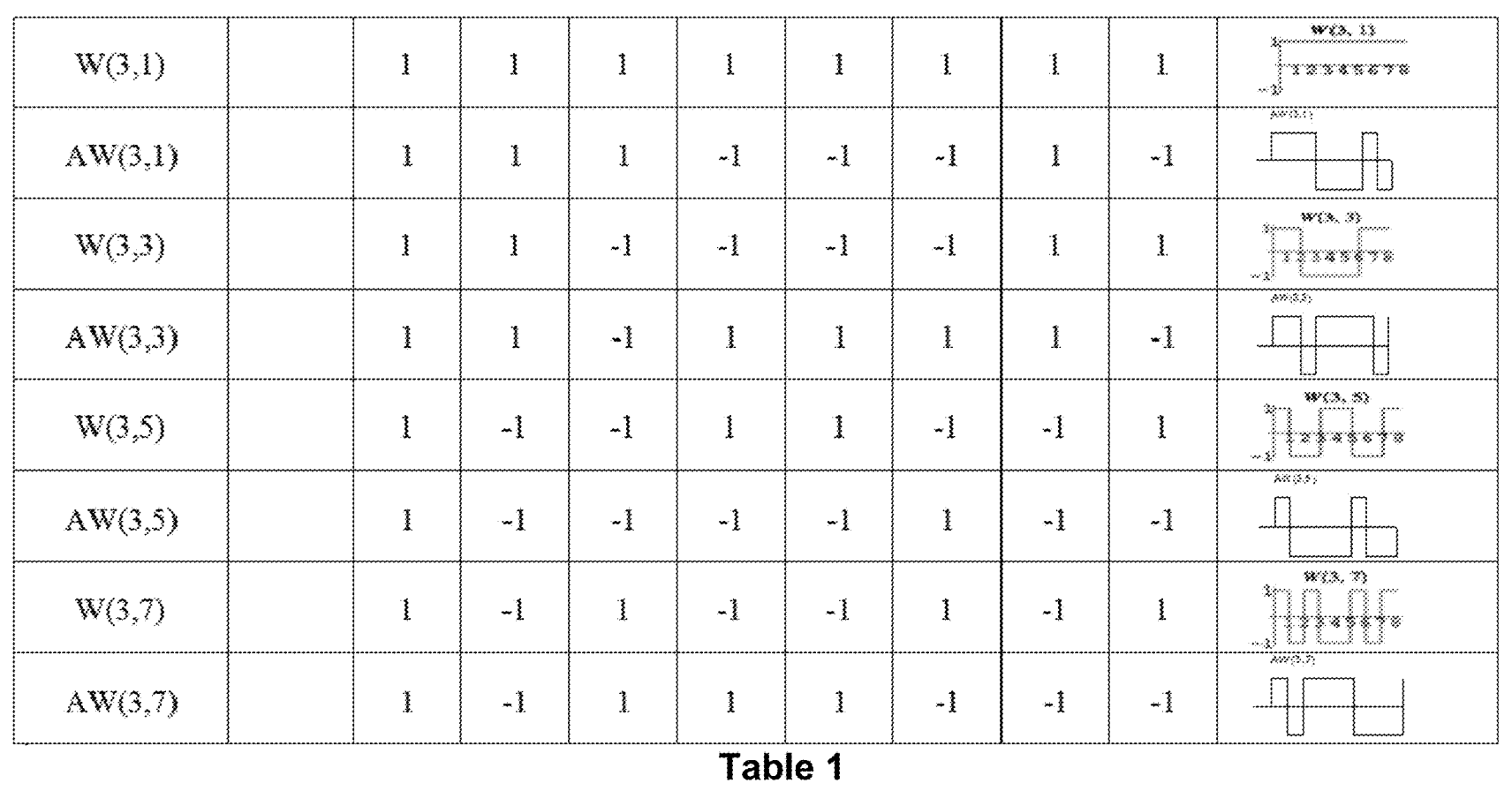

The Golay Sequence A is multiplied with the even Walsh function of order 3—W(3,m)—resulting in the Golay-Walsh sequences AW(3,m). Example formations are AW(3,1), AW(3,3), AW(3,5) and AW(3,7). These are depicted in table 1 in FIG. 23 with two phase steps at 0° and 180°, whereby these consist of eight sub-pulses that correspond to the chips.

The families suitable for a code multiplex system, the orthogonal Walsh and Golay-Walsh sequences, have the size of N, such that N spread data signals can be transmitted in one frequency band.

The decoding of a received spread data signal according to WO 2010/108823 comprises the additional steps of the formation of a converted spread data signal through the multiplication of the spread Walsh signal with a Golay sequence, the formation of the time-reversed converted spread signal, the formation of the +1, −1 weighted (complementary) converted spread data signal out of the spread converted data signal and the weighted (complementary) time-reversed converted data signal out of the time-reversed converted data signal through multiplication of the chip sequence with +1 and −1 (called weighting), the correlation of the converted data signals with the time-reversed converted signal with a Golay-Walsh sequence, the time-reversed converted spread data signal with the time-reversed Golay-Walsh sequence, the complementary converted Golay-Walsh sequence and the complementary time-reversed converted spread data signal with the complementary time-reversed Golay-Walsh sequence, the summation of these four correlations, and the connection of the two formed sums through an AND operation.

Sidelobes still existing at some shifts τ>0 are completely removed through this embodiment, both in the AKF as well as simultaneously in all KKFs of the Walsh sequences or Golay-Walsh sequences.

This method of WO 2010/108823 therefore has the advantage that the correlation properties of transmitted spread data signals are improved up to the perfect optimum. Both the sums of the autocorrelation as well as those of the cross-correlation functions of the invention's de-spread data signals show absolutely no sidelobes different from zero, in contrast to applications without this method.

Figure 8:
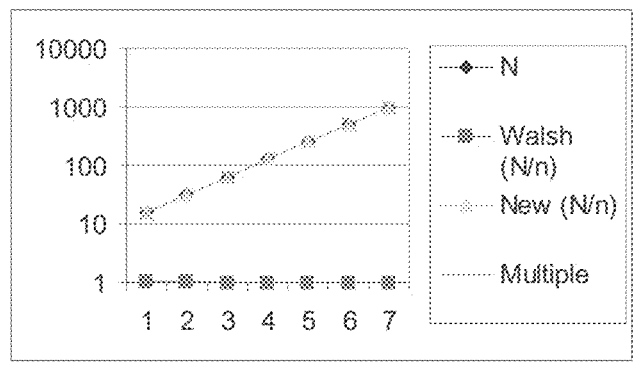
FIG. 8 presents the multiples of the main to secondary maxima ratio of AKF and KKF in comparison to the Walsh sequences according to a second embodiment.

Without the method of WO 2010/108823, some of the signature sequences in code division multiplex access systems used so far, like for example Gold sequences and Walsh sequences, show imperfect aperiodic AKF values and high values for the KKF; moreover, the orthogonality gets lost even with small synchronization errors or errors through signal distortion or multipath propagation. The diagrams in FIGS. 8 and 9 depict the improvement possibilities of this invention in multiples compared to Walsh sequences and Gold sequences, respectively, used so far:

FIG. 8 presents the multiples of the improvement of the main to sidelobes ratios of the AKF and KKF in comparison to Walsh sequences.

Figure 9:
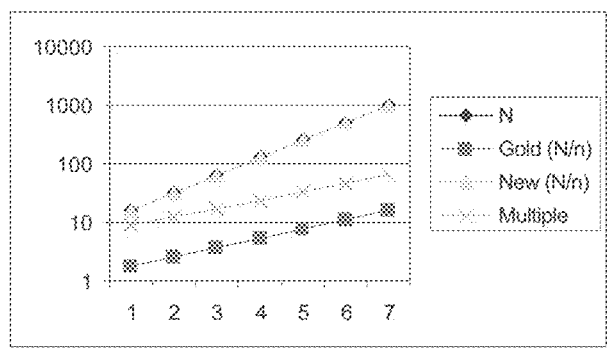
FIG. 9 presents the multiples of the main to secondary maxima ratio of KKF and aperiodic AKF compared to Gold sequences according to a second embodiment.

FIG. 9 presents the multiples of the improvement of the main to secondary sidelobes ratios of the KKF and aperiodic AKF compared to Gold sequences.

This way the spread signal can be best differentiated from noise and it can be filtered out in an optimum manner from interfering signals or co-channel interferences.

In an asynchronous CDMA system, an available useful signal with the amplitude N adds to the N−1 users in terms of power at the input of the decisional stage—given the power control as precondition. According to the new invention's method, the signal to interference ratio results in $N^2/(N-1) \sim N$. That is, with a sequence length of N=64 one already achieves 18 dB—for bipolar transmission 13 dB would already be enough—up to 30 dB with sequence length of 1024. These are values which could not be achieved with current sequences (refer to the two diagrams FIGS. 8 and 9). Gold sequences with N=1024 have achieved around 3 dB in asynchronous operation so far. In other words, synchronization is no longer a necessary precondition for CDMA systems so far with their Walsh or Gold sequences, and the subscriber quantity will not be reduced through cross-talk of other subscribers.

The aforementioned advantages of the method described above particularly arise in CDMA systems. Here, the application of the method results in a fast power control, a simplified soft handover at the cell boundaries as well as a frequency reuse factor of N=1 between neighbor cells, i.e. more subscriber capacity through the usage of more than one frequency in one cell.

Figure 1:
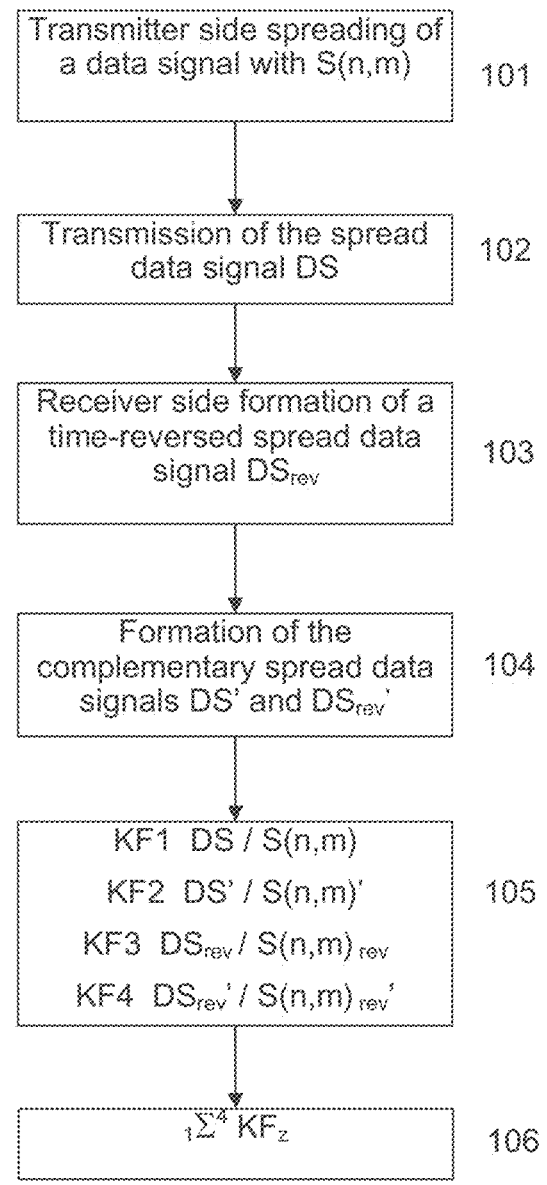
FIG. 1 shows a flow diagram whereby a method for the de-spreading of a spread data signal according to the first embodiment of WO 2010/108823 is depicted.

The method according to WO 2010/108823 as well as its realizations will be explained using the FIGS. 1 to 8:

Referring to FIG. 1 now the method according to a first embodiment of WO 2010/2010/108823 will be described.

First, in step 101, the data signal to be transmitted is spread with a spread spectrum sequence S. For this purpose the present invention uses a Walsh function (the in WO 2010/108823 described Golay-Walsh sequences are not used in the present invention for the spreading on the transmitter side). For spreading in the transmitter, one bit of the data signal is coded with a spread spectrum sequence S such that a spread data signal DS is generated with the quantity of so-called chips (binary signals) corresponding to the applied Walsh spread spectrum sequence S.

For the transmission of data signals from multiple subscribers within a frequency band, each spread spectrum sequence S is multiplied within a coder with the data signal of the corresponding subscriber, i.e. coded. Since these spread data signals DS are orthogonal to each other, the data signals of different subscribers can be reconstructed later within the receiver, almost without disturbances.

Afterwards, the spread data signals DS are A/D-converted and transmitted in step 102, e.g. via a radio network in a CDMA mobile radio system or via a fiberglass cable in a backbone network.

Figure 2:
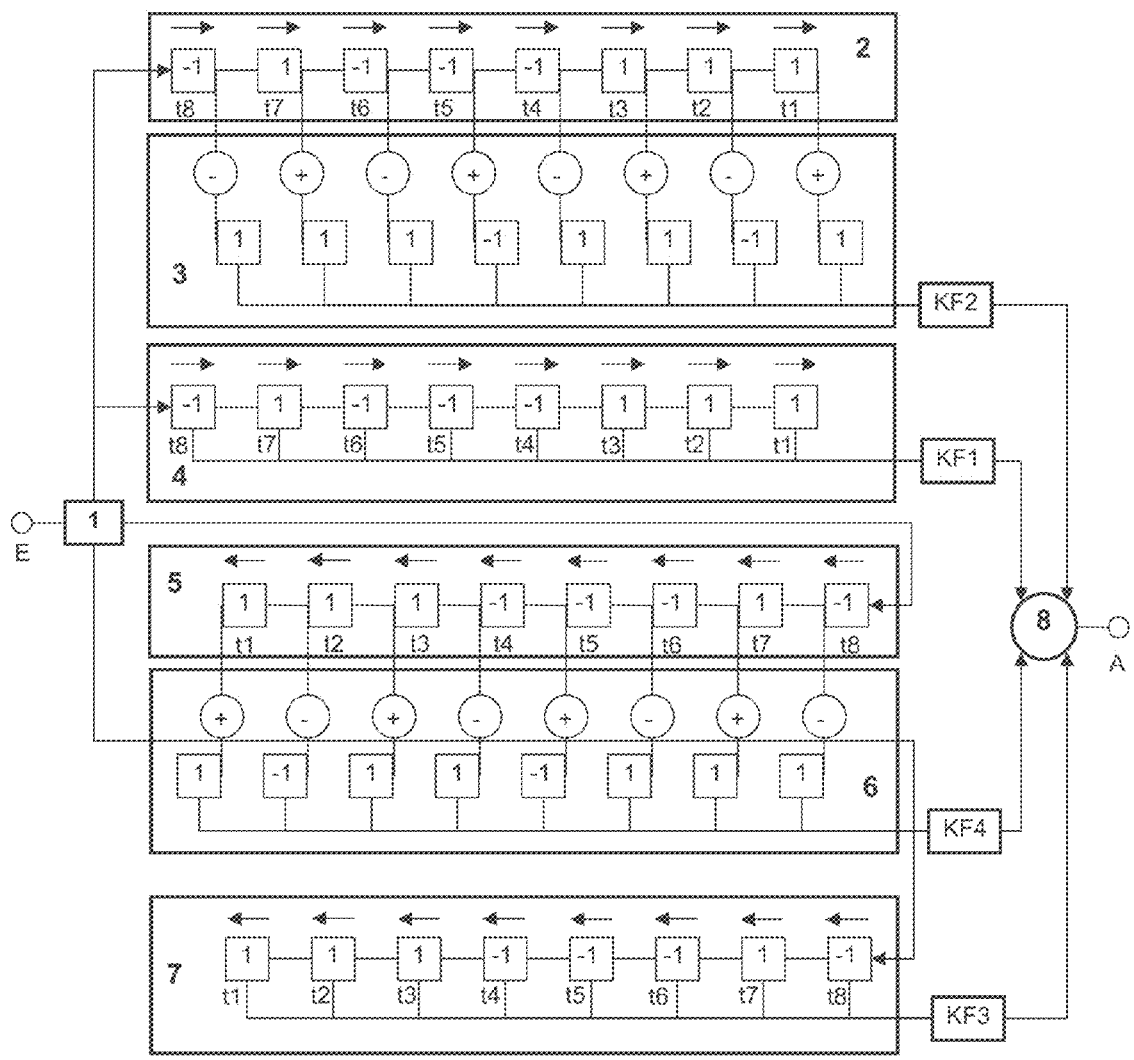
FIG. 2 schematically shows a first realization of an apparatus for performing the method of the first embodiment according to FIG. 1.
Figure 3:
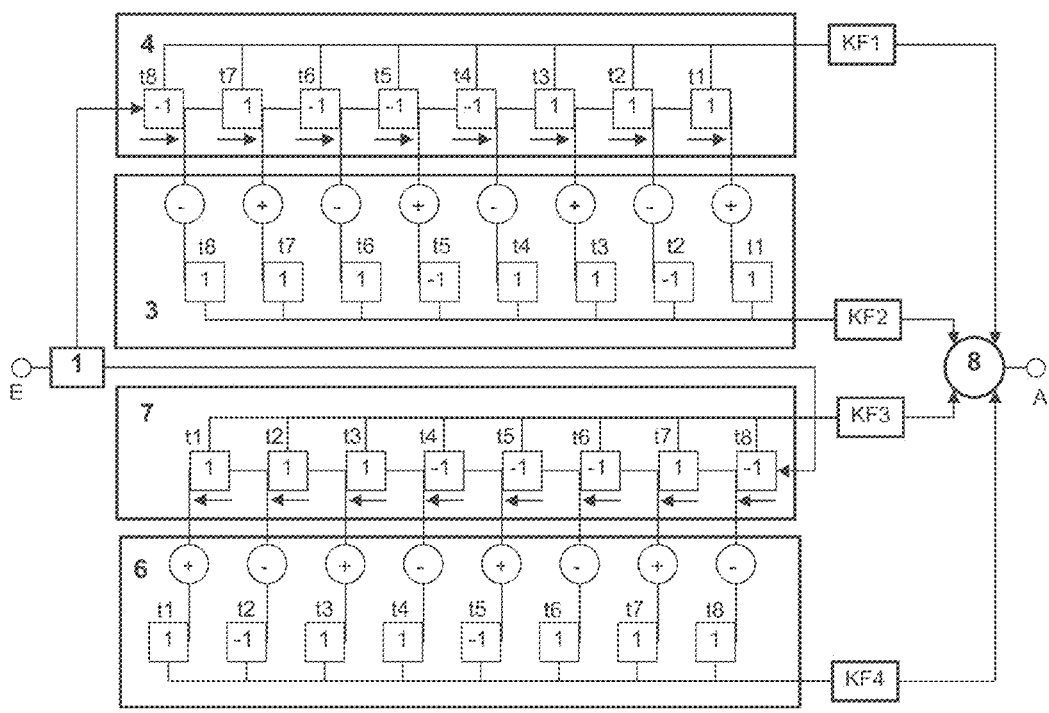
FIG. 3 schematically shows a second realization of an apparatus for performing the method of the first embodiment according to FIG. 1.

After the transmission of the spread data signal DS in step 102, it will be digitized according to steps 103 to 106 and decoded. For that, the decoder for the de-spreading of the spread data signal DS can be applied (to be described later); two exemplary realizations herefrom for spread spectrum sequences of chip length 8 are depicted in FIGS. 2 and 3.

First in step 103, a time-reversed spread data signal $DS_{rev}$, e.g. spread by a Walsh sequence is established from the received data signal DS. For that, the received chips of the spread data signal DS are saved in reverse order.

Then in step 104, the respective complementary spread data signals DS', $DS_{rev}$' are formed from these two spread data signals DS, $DS_{rev}$.

This is accomplished through the serial or parallel alternating multiplication of the respective data signals with +1 and −1, as for example depicted in the following table for the Golay-Walsh sequence AW(3,7):

TABLE 2

| AW(3,7)     | 1 | −1 | 1 | 1  | 1 | −1 | −1 | −1 |
|-------------|---|----|---|----|---|----|----|----|
| Alternation | 1 | −1 | 1 | −1 | 1 | −1 | 1  | −1 |
| AW(3,7)'    | 1 | 1  | 1 | −1 | 1 | 1  | −1 | 1  |

Steps 103 and 104 can also be performed in reverse order.

The four spread data signals DS, $DS_{rev}$, DS', $DS_{rev}$' are the correlated within the receiver for the corresponding subscriber with the spread spectrum sequence S and their respective derivates S', $S_{rev}$, or $S_{rev}$', in order to filter out the original spread data signal out of the multiple of received spread data signals of other subscribers, which are modulated onto the frequency band.

It shall be observed that autocorrelations and cross-correlations respectively are formed between the spread data signal DS and the spread spectrum sequence S, between the time-reversed data signal $DS_{Rev}$ and the time-reversed spread spectrum sequence $S_{Rev}$, between the complementary spread data signal DS' and the complementary spread spectrum sequence S' and between the complementary time-reversed data signal $DS_{Rev}$' with the complementary time-reversed spread spectrum sequence $S_{Rev}$', whereby the already described auto- and cross-correlation sums are used:

$$AKF_k = \sum_{i=0}^{N-k-1} X_i X_{i+k} \text{ respectively. } KKF_k = \sum_{i=0}^{N-k-1} X_i Y_{i+k} \quad \text{Equation (4)}$$

Hereby N symbolizes the number of chips in a sequence, i designates each chip in a sequence and k is the runtime shift of the sequence when calculating each single correlation function $KKF_k$ (shift in number of sub-pulses t).

The following tables 3, 4, 5 and 6 show the different cross-correlation functions as designated above for the Golay-Walsh sequences AW(3,7) and AW(3,1) as examples. Each column corresponds to a runtime to which the signals arrived at each other. Within this example it is assumed that the Golay-Walsh sequence AW(3,1) and their derivates are saved in the apparatus for the calculation of the correlations.

TABLE 3

|         |       |       |       |       |       |       |       |       | AW(3, 7) |       |       |       |       |       |       |
|---------|-------|-------|-------|-------|-------|-------|-------|-------|----------|-------|-------|-------|-------|-------|-------|
| AW(3, 1) | 1    |       |       |       |       |       |       |       | 1        | −1    | 1     | 1     | 1     | −1    | −1    | −1 |
|         | 1     |       |       |       |       |       |       | 1     | −1       | 1     | 1     | 1     | −1    | −1    | −1    |
|         | 1     |       |       |       |       |       | 1     | −1    | 1        | 1     | 1     | −1    | −1    | −1    |       |
|         | −1    |       |       |       |       | −1    | 1     | −1    | −1       | −1    | 1     | 1     | 1     |       |       |
|         | −1    |       |       |       | −1    | 1     | −1    | −1    | −1       | 1     | 1     | 1     |       |       |       |
|         | −1    |       |       | −1    | 1     | −1    | −1    | −1    | 1        | 1     | 1     |       |       |       |       |
|         | 1     |       | 1     | −1    | 1     | 1     | 1     | −1    | −1       | −1    |       |       |       |       |       |
|         | −1    | −1    | 1     | −1    | −1    | −1    | 1     | 1     | 1        |       |       |       |       |       |       |
| KKF1    |       | −1    | 2     | −3    | 0     | −1    | 2     | −3    | 0        | 1     | 6     | 3     | 0     | −3    | −2    | −1 |
|         |       | $t_1$ | $t_2$ | $t_3$ | $t_4$ | $t_5$ | $t_6$ | $t_7$ | $t_8$    | $t_9$ | $t_{10}$ | $t_{11}$ | $t_{12}$ | $t_{13}$ | $t_{14}$ | $t_{15}$ |

TABLE 4

|          |       |       |       |       |       |       |       |       | AW(3,7)' |       |       |       |       |       |       |
|----------|-------|-------|-------|-------|-------|-------|-------|-------|----------|-------|-------|-------|-------|-------|-------|
| AW(3,1)' | 1     |       |       |       |       |       |       |       | 1        | 1     | 1     | −1    | 1     | 1     | −1    | 1  |
|          | −1    |       |       |       |       |       |       | −1    | −1       | −1    | 1     | −1    | −1    | 1     | −1    |
|          | 1     |       |       |       |       |       | 1     | 1     | 1        | −1    | 1     | 1     | −1    | 1     |       |
|          | 1     |       |       |       |       | 1     | 1     | 1     | −1       | 1     | 1     | −1    | 1     |       |       |
|          | −1    |       |       |       | −1    | −1    | −1    | 1     | −1       | −1    | 1     | −1    |       |       |       |
|          | 1     |       |       | 1     | 1     | 1     | −1    | 1     | 1        | −1    | 1     |       |       |       |       |
|          | 1     |       | 1     | 1     | 1     | −1    | 1     | 1     | −1       | 1     |       |       |       |       |       |
|          | 1     | 1     | 1     | 1     | −1    | 1     | 1     | −1    | 1        |       |       |       |       |       |       |
| KKF2     |       | 1     | 2     | 3     | 0     | 1     | 2     | 3     | 0        | −1    | 6     | −3    | 0     | 3     | −2    | 1  |
|          |       | $t_1$ | $t_2$ | $t_3$ | $t_4$ | $t_5$ | $t_6$ | $t_7$ | $t_8$    | $t_9$ | $t_{10}$ | $t_{11}$ | $t_{12}$ | $t_{13}$ | $t_{14}$ | $t_{15}$ |

TABLE 5

|  | | | | | | | | | AW(3,7)_Rev | | | | | | |
|---|---|---|---|---|---|---|---|---|---|---|---|---|---|---|---|
| AW(3,1)_Rev | -1 | | | | | | | 1 | 1 | 1 | -1 | -1 | -1 | 1 | -1 |
|  | 1 | | | | | | -1 | -1 | -1 | 1 | 1 | 1 | -1 | 1 | |
|  | -1 | | | | | 1 | 1 | 1 | -1 | -1 | -1 | 1 | -1 | | |
|  | -1 | | | | 1 | 1 | 1 | -1 | -1 | -1 | 1 | -1 | | | |
|  | -1 | | | 1 | 1 | 1 | -1 | -1 | -1 | 1 | -1 | | | | |
|  | 1 | | -1 | -1 | -1 | 1 | 1 | 1 | -1 | 1 | | | | | |
|  | 1 | -1 | -1 | -1 | 1 | 1 | 1 | -1 | 1 | | | | | | |
|  | 1 | -1 | -1 | -1 | 1 | 1 | 1 | -1 | 1 | | | | | | |
| KKF3 | | -1 | -2 | -3 | 0 | 3 | 6 | 1 | 0 | -3 | 2 | -1 | 0 | -3 | 2 | -1 |
|  | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ | $t_{15}$ |

TABLE 6

|  | | | | | | | | | AW(3,7)_Rev' | | | | | | |
|---|---|---|---|---|---|---|---|---|---|---|---|---|---|---|---|
| AW(3,1)_Rev' | -1 | | | | | | | 1 | -1 | 1 | 1 | -1 | 1 | 1 | 1 |
|  | -1 | | | | | | 1 | -1 | 1 | 1 | -1 | 1 | 1 | 1 | |
|  | -1 | | | | | 1 | -1 | 1 | 1 | -1 | 1 | 1 | 1 | | |
|  | 1 | | | | -1 | 1 | -1 | -1 | 1 | -1 | -1 | -1 | | | |
|  | -1 | | | 1 | -1 | 1 | 1 | -1 | 1 | 1 | 1 | | | | |
|  | -1 | | 1 | -1 | 1 | 1 | -1 | 1 | 1 | 1 | | | | | |
|  | 1 | -1 | 1 | -1 | -1 | 1 | -1 | -1 | -1 | | | | | | |
|  | -1 | 1 | -1 | 1 | 1 | -1 | 1 | 1 | 1 | | | | | | |
| KKF4 | | 1 | -2 | 3 | 0 | -3 | 6 | -1 | 0 | 3 | 2 | 1 | 0 | 3 | 2 | 1 |
|  | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ | $t_{15}$ |

Eventually in step 106, the summation is formed over the four cross-correlation sums from the example out of tables 3 through 6 (refer to table 7):

TABLE 7

|  | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ | $t_{15}$ |
|---|---|---|---|---|---|---|---|---|---|---|---|---|---|---|---|
| Σ KKF1-KKF4 | 0 | 0 | 0 | 0 | 0 | 16 | 0 | 0 | 0 | 16 | 0 | 0 | 0 | 0 | 0 |

In case the spread data signal AW(3,3) or AW(3,5) arrives in the decoder with the saved Golay-Walsh sequence AW(3, 1), then the corresponding sums of the cross-correlations calculated according to the tables 3 through 7 result in a zero value for all runtime shifts.

The autocorrelations result in a corresponding way:

$$\Sigma AKF1 - AKF4 \qquad \text{Equation (5)}$$

The autocorrelation functions AKF1 are formed analogously to the above presented cross-correlations:

AKF1=correlation of the spread data signal DS with the saved spread spectrum sequence S.
AKF2=correlation of the spread data signal DS' with the saved spread spectrum sequence S'.
AKF3=correlation of the time-reversed spread data signal $DS_{Rev}$ with the time-reversed saved spread spectrum sequence $S_{Rev}$.
AKF4=correlation of the received time-reversed weighted spread data signal $DS_{Rev}$' with the time-reversed weighted saved spread spectrum sequence $S_{Rev}$'.

The AKF and KKF properties of the Walsh sequences are substantially improved by means of the described method. After execution of the steps designated below following example of the first eight correlations demonstrates the result in FIG. 6.

Contrary to the conventional KKFs of the Walsh sequences, the prevailing part of the sidelobes has disappeared through the application of the method. Only three pairs, W(3,1)/W(3,3) (refer to FIG. 6), W(3,2)/W(3,4) and W(3,5)/W(3,7), of the 27 possibilities of cross-correlations altogether show small sidelobes. Also, four of the seven KKF have no values unequal zero.

Even the autocorrelation sums AKF of triangular, wide shape, not suitable for synchronization, are improved and have an advantageous minimum other than the main data signal peak which helps to control small time shifts.

Hence on each side of the main maximum of the AKF there is a minimum with a zero or rather a −1, such that a runtime shift oft can even be compensated in case of infringements of the main maximum. Also, four of the seven KKFs have no values different from zero.

If the spreading is accomplished with Golay-Walsh sequences AW(n,m), its AKF and KKF are also substantially improved with the described method. These have the following internal symmetrical property that is used in the reception filter of the decoder for the ideal pulse compression with low sidelobes: with the summation above, the sums of the AKF result in zero for all sidelobes values as can be seen in the table in FIG. 5; graphically shown in FIG. 7. This is a great advantage in comparison to the AKF for a transmission of the data signal without the described method.

Figure 7:
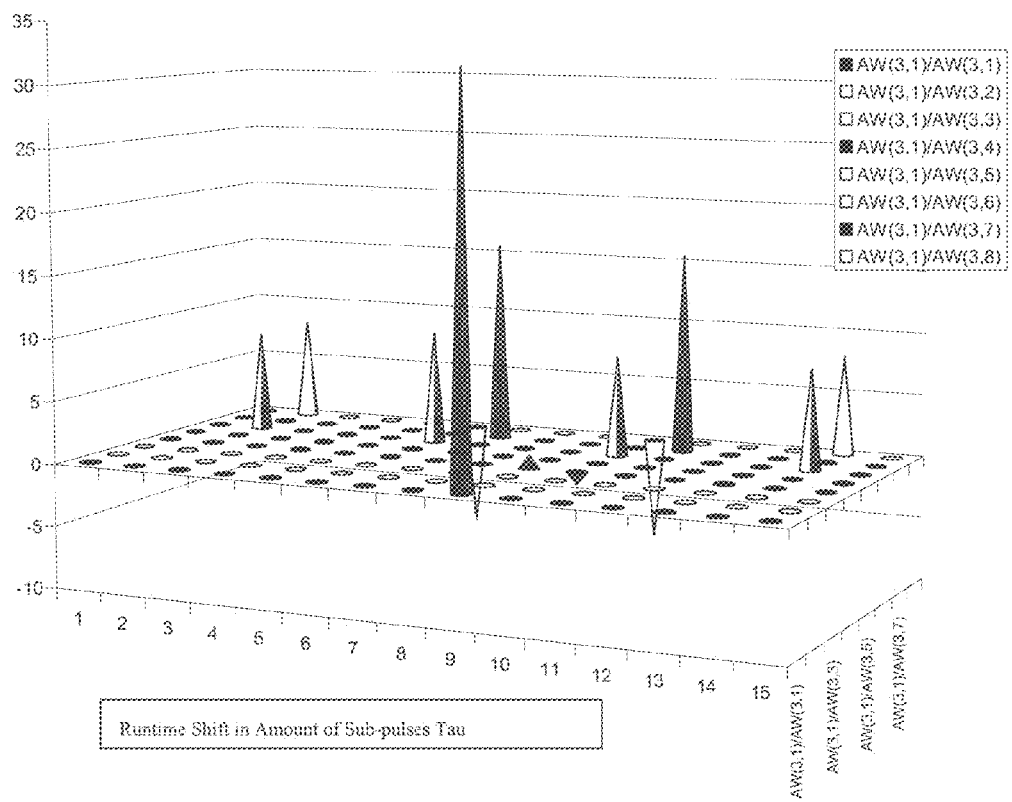
FIG. 7 depicts the correlations of Golay-Walsh sequences of order three in a diagram after execution of the method's steps according to the first embodiment.

In addition, the KKFs between the data signals spread with the described spread spectrum modulation method have at most only four small values compared to the AKF, which in the exemplary values for the Golay-Walsh sequences with eight chips, only arise only for three out of seven further used sequences, in the case of AW(3,1) for AW(3,6), AW(3, 7) and AW(3,8), (refer to FIG. 5 and FIG. 7).

FIG. 5 will be further explained in the following. The four rows of the first group correspond to the case that the Golay-Walsh sequence AW(3,1) and its derivates are saved in the described decoder. If a spread data signal AW(3,1) arrives in this decoder, the correlation (first row in the first group of FIG. 5) thus results in only one single output pulse with an amplitude of 32 in column $t_8$, in which both sequences have no shift against each other ($\tau$=8 or index k=0). This corresponds to the case of autocorrelation.

However, if a spread sequence AW(3,3) in the decoder arrives with the saved sequence AW(3,1), the correlation of these two sequences results in zero across the table according to the second row of the first group of table entries.

In case a spread signal AW(3,5) arrives, then the zero value appears everywhere also in the third row.

If a spread signal AW(3,7) arrives, then an output value of 16 arises, corresponding to the fourth row in columns $t_6$ and $t_{10}$. However, this correlation value between the spread signals AW (3,1) and AW(3,7) is so far away from the value of 32 from the autocorrelation of the signal AW(3,1), that it guarantees an unambiguous detection of the requested signal.

The three groups in FIG. 5 correspond to the cases when the decoder has saved AW(3,3), AW(3,5) and AW(3,7) respectively and its derivates. In all cases, there is a wide distance between the respective useful signal with the value 32 and the interfering signals with values +/-16.

Figure 4:
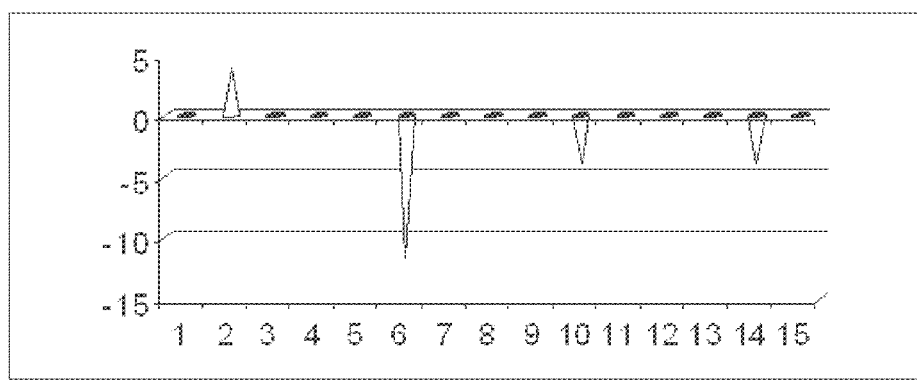
FIG. 4 shows a graphical depiction of the sums of the cross-correlation sums KF AW(3,5)/AW(3,3) and KF AW(3,5)/AW(3,5)', without the addition of the time-reversed spread data signals from the method's first embodiment in FIG. 1.

If the described method was carried out without the time-reversal step 103 and the summation of the correlations calculated in this way, then more values of the KKF would be unequal to zero and the amounts would be larger. FIG. 4 shows the result of the direct KKF without time reversal between the Golay-Walsh sequence exemplary AW(3,5) and AW (3,3). Evidently, four interfering peaks arise that would lead to interference during decoding.

Some or all of the described method steps and perhaps additional steps can be surely performed in the frequency domain.

A decoder will be described in the following for the realization of the method on the receiver side, which is depicted in two different embodiments in the FIGS. 2 and 3.

The decoder receives spread data signals DS that are first e.g. smoothened by a sub-pulse filter and converted from analog to digital. Then these are applied to the input E of the decoder. The envelope of the spread data signal DS after a sub-pulse filter and A/D converter will be passed on as a positive or negative digital number (chip), here symbolized as +1, and −1 respectively, depending on the phase displacement 0 or 180 degrees. Within these embodiments, the spread data signals DS are binary data sequences of length 8, with eight chips, which have been spread with spread spectrum sequences S. Obviously, the decoder can be adapted accordingly for each data sequence length $2^n$.

The serially-received sequences of the spread data signals DS are then saved and transformed into parallel form. This e.g. can be achieved with a shift register or another serial-parallel converter.

In the described embodiment, the eight chips of the received data signal DS are branched off sequentially in apparatus 1 into shift registers 2, 4, 5, 7, which are switched forward in time after each sup-pulse duration $\tau$. The instants in which the chips were fed into the shift registers 2, 4, 5, 7 are indicated through the time designators t1 to t8. Two of the shift registers 5 and 7 are filled in reverse order, corresponding to the time reversal of step 104 of the invention's method. Since the chronological order of the chips is changed, the result is a reverse passing on. In an alternative embodiment, which is depicted in FIG. 3, only two shift registers 4 and 7 are used. The branching apparatus 1 then only branches the digitally spread data signal DS twice.

Two of the sequences of the data signals DS saved in 2, 4, 5, and 7 are transformed into complementary form by weighting (multiplying) the chips of the sequences alternately with +1 and −1, respectively. After the first sub-pulse duration $\tau$, e.g. after the first position of the shift register 2, 7, a second signal is derived and alternately weighted with + and −. Through the weighting of the received signal code with the simple sequence of alternating phase steps $B_i$=+, −, +, −, +, −, +, − (or digital values +1, −1 and so on or e.g. L, 0 and so on with QPSK) the corresponding weighted spread data signal DS' arises; for a data signal DS spread with a Golay- or Golay-Walsh sequence, the complementary data signal DS' results. Alternately, the weighting of the received signal code with the +/− sequence can also be accomplished in parallel circuitry as depicted in the embodiments of FIGS. 2 and 3.

As soon as the shift registers are filled, the chips are passed on in parallel. Two of the four saved sequences of the spread data signals DS, DS', one of the two sequences in weighted form, are being passed on in time-reversed order, such that signal sequences of time-reversed spread data signals result ($DS_{rev}$, $DS_{rev}'$). After that (corresponding to step 105 in FIG. 1) the signal sequences are correlated in correlation filters (KF1, KF2, KF3, KF4) with the corresponding saved spread spectrum sequence S(3,m), S (3,m)$_{Rev}$, S (3,m)', S (3,m)$_{Rev}'$.

The decoder can be designed such that, for each of the different spread spectrum sequences S of the multi-subscriber operation, a decoding circuit is provided according to FIG. 2 or 3 with the corresponding saved spread spectrum sequences. In a preferred embodiment, only one of the decoding circuits is used with a correlation circuit with a rewrite memory; the spread spectrum sequence for that specific subscriber can be fed into this memory, during the initialization of the communication process for example.

Eventually the sum over the four auto- or cross-correlations respectively, of the four parallel processed signal sequences is formed in the summation filter 8.

This can be accomplished with the summation filter 8 depicted in FIGS. 2 and 3 in front of the devide's exit A, which is a simple addition. The autocorrelation signal is detected as a useful signal (with value 32 in the examples according to FIG. 5), which is distinctly different from the clearly smaller sidelobes (with value 16) and can be electronically processed easily.

Conjunction Test

The second embodiment of the method according to WO 2010/108823, as well as their realization as an apparatus, will be explained in the following by means of FIGS. 8 to 13:

The second embodiment of the method is based upon the first embodiment.

In decoding, both the sums of the correlations of the spread data signals DS with saved Walsh sequences W(n,m) are formed, as well as after multiplication with the Golay-Walsh sequence AW(n,1); the correlations of the such resulting, converted spread data signals DAW(n,m) with saved Golay-Walsh sequences AW(n,m), AW(n,m)', AW(n,m)$_{rev}$, and AW(n,m)$_{rev}$', (refer to steps 106 and 111). After both sums are formed in step 106 and 111, they are correlated with an AND-operation;

$$(_1\Sigma^4 KF_z)\char94(_5\Sigma^8 KF_z).$$  Equation (6)

Figure 6:
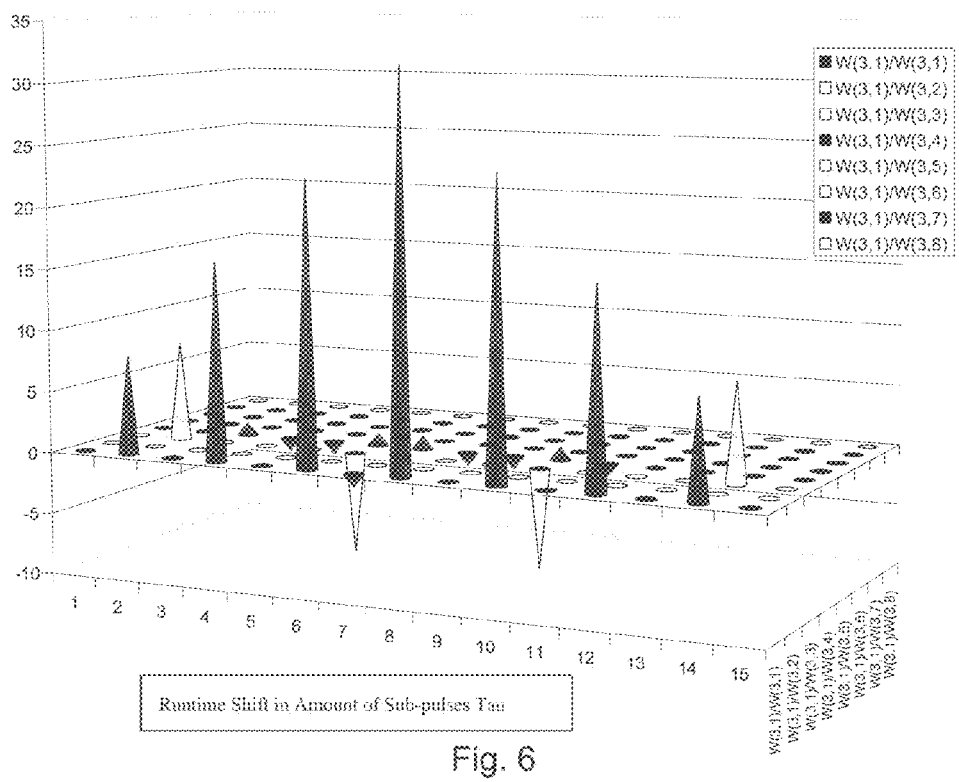
FIG. 6 depicts the correlation of Walsh sequences of order three in a diagram after the execution of the method's steps according to the first embodiment.

The result after performing the method steps 101 to 106 without the addition of the second embodiment demonstrate the examples of the first eight correlations in FIGS. 6 and 7.

For each value of the sidelobes of a KKF of the Walsh sequences, a value of zero corresponds to the correlation of the corresponding Golay-Walsh sequence with the exception of the main maximum AKF at $\tau=0$, which is fully preserved. Hence all sidelobes at all displacements $\tau>0$ are suppressed with the operation of the logical AND function, whereas the AKF shows the requested result: the ideal form of an unit pulse peak at $\tau=0$ for the detection of the useful signal, and simultaneously, all sidelobes are zero at all displacements $\tau>0$.

The three correlation pairs W(3,1)/W(3,3) (refer to FIG. 6), W(3,2)/W(3,4) and W(3,5)/W(3,7) of altogether 27 possibilities of cross-correlations show small sidelobes. The autocorrelation sums that are triangular in the original Walsh sequences and such are not suited for synchronization are certainly improved, however, they still contain high sidelobes next to the main signal peak. This is evident from FIG. 5. If a spread data signal AW(3,7) arrives according to the third row, then an exit value of 16 results in columns $t_6$ and $t_{10}$ an exit value of 16 results. This value, however, is suppressed through the AND-operation with the sum of the Walsh sequences, which has the value zero everywhere, as demonstrated in the following.

Figure 13:
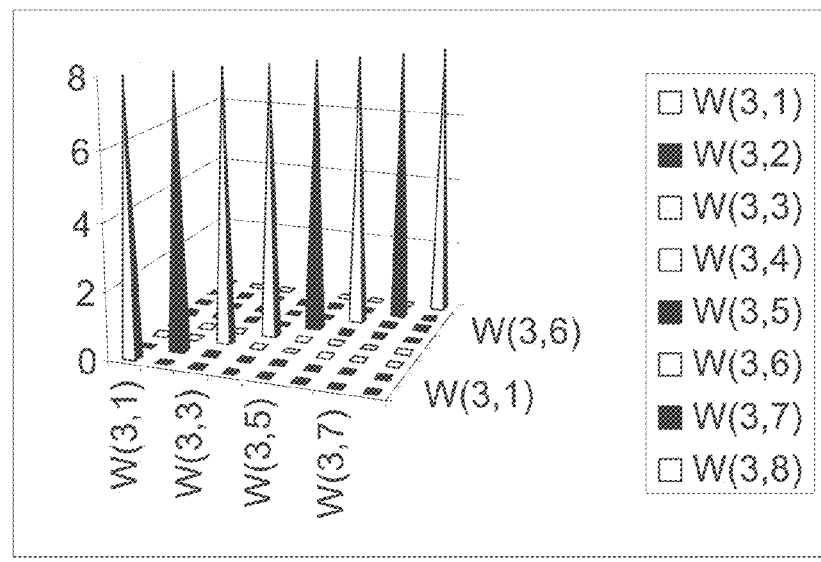
FIG. 13 summarizes the complete result of the new-found method of AKF and KKF for the example of Walsh sequences W(3,m).

The Golay-Walsh sequences AW(n,m) generated in the receiver by multiplication have the following internal symmetry property that is used in the reception filter for the ideal pulse compression: by means of the addition above, the sum of the AKFs results in zero for all sidelobes as evident from FIG. 5 and depicted graphically in FIG. 13. Hence it holds true for the AND-operation of the AKF results of the rows W(3,1)/W(3,1) with the results of the corresponding Golay-Walsh sequence AW(3,1)/AW(3,1) for the sums of the AKFs:

EXAMPLE 1

W(3,1)/W(3,1): 0,8,0,16,0,24,0,32,0,24,0,16,0,8,0
 Logically "AND"
AW(3,1)/AW(3,1): 0,0,0,0,0,0,0,32,0,0,0,0,0,0,0
 =0,0,0,0,0,0,0,32,0,0,0,0,0,0,0

The KKF between the data signals spread in the method steps 101 to 106 of the first embodiment still have four small values compared to the AKF, which in the case of the exemplary indicated values for the Golay-Walsh sequence with eight chips, also exists for three of the seven used Golay-Walsh sequences; in the case of AW(3,1) for AW(3, 6), AW(3,7) and AW(3,8), as evident from FIG. 6 and FIG. 7.

Through the second embodiment of the method both the AKF as well as the KKF properties of the Walsh sequences are improved up to the absolute optimum because the AND-operation of the sums of the KKF of Walsh sequences with those of the Golay-Walsh sequences leads to the complete extinction of sidelobes as the two following examples illustrate:

EXAMPLE 2

W(3,1)/W(3,3): 0,8,0,0,0,−8,0,0,0,−8,0,0,0,8,0
 Logically "AND"
AW(3,1)/AW(3,3): 0,0,0,0,0,0,0,0,0,0,0,0,0,0,0
 =0,0,0,0,0,0,0,0,0,0,0,0,0,0,0

EXAMPLE 3

W(3,1)/W(3,7): 0,0,0,0,0,0,0,0,0,0,0,0,0,0,0
 Logically "AND"
AW(3,1)/AW(3,7): 0,0,0,0,16,0,0,0,16,0,0,0,0,0,0
 =0,0,0,0,0,0,0,0,0,0,0,0,0,0,0

This holds true for all other sums of the KKF, as evident from the FIGS. 6 and 7.

FIG. 13 summarizes the final results of the conjunction test for of AKF and KKF for the example of Walsh sequences W(3,m).

The comparison via an AND-operation in the receiver of the exit values from the correlation sums of the Walsh sequences according to the method's steps 101 to 106 with the threshold value from the correlation sums of the Golay-Walsh sequences thus delivers an absolutely pure pulse peak without sidelobes for the AKF. All KKFs also remain absolutely zero as shown in diagram FIG. 13.

The aforementioned decoder can be realized alternatively with digital signal processors (DSP). Another possibility of realization consists of applying the fast Fourier transformation DFFT and/or the fast Hadamard transformation in the de-coder. Analogously this holds true for an apparatus for transmitting digital signals that comprises a coder and decoder, subject to the description.

Asynchronous Reception

The disadvantage of asynchronous disturbances unsolved in WO 2010/108823 is remedied with the method and decoder of the present invention.

Figures 24, 25:
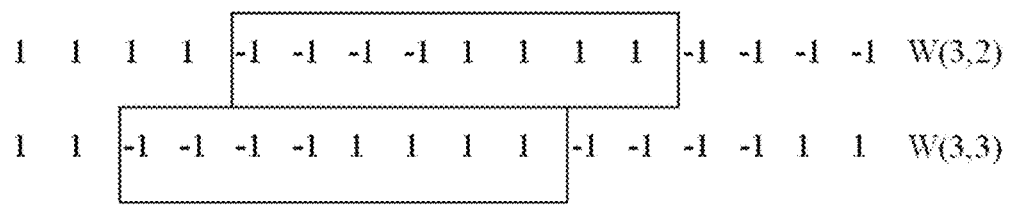
FIG. 24 is a figure showing two Walsh Sequences.
FIG. 25 is a table of time-shifted, periodic cross-correlation of Walsh Sequences.

The decoder delivers the ideal Dirac pulse in perfect synchronous transmission. However, small deviations in synchronicity already lead to disturbances from neighbor channels. E.g., through a time delay of two chips the Walsh Sequence W(3,2)=1 1 −1 −1 1 1 −1 −1 within continuous, periodic transmission will be transformed into W(3,3)=1 1 −1 −1 −1 −1 1 1, as shown in FIG. 24.

If there is no synchronization within the transmission link (e.g. within the UMTS uplink), then this leads to disturbances like crosstalk or interruptions, since extraneous, asynchronous signals arriving from other subscribers having the same amplitude cannot be separated.

The following shall demonstrate in more detail the problem which is solved through the present invention.

Let's assume the decoder is subjected to a periodic, synchronous Walsh Sequence
W (3,2)=1 1 1 1 −1 −1 −1 −1.

The N=8 chips of this sequence is introduced step by step per subpulse $\tau$ (chip time shift) into the registers of the decoder as digital numbers 0 or 1. In total, there are 2N−1=15 chip time steps required, beginning with the first chip into the register until the last chip leaves the register.

The correlation is calculated with each chip time step for the respective content of the register. The total results for the AKF- and KKF-functions are depicted in Table 8, which the decoder calculates with the stored sequence
W(3,3)=1 1 −1 −1 −1 −1 1 1
for each of the 17 time steps (chip time shifts) (according to the sequence length of N=8) from the arrival of the signal in the time steps t1 to t8 over a fully synchronous in the decoder registered signal (with time step t9) and running out of the signal in further seven time steps (t10 to t17).

The periodically, sequentially arriving Walsh Sequences W(3,2) are exactly synchronous (i.e. without time shift) at the time shifts t1, t9 and t17 to the stored Walsh Sequence W(3,3) and the correlation therefore results in the value 0. At the other time shifts during registering the incoming Walsh Sequences W(3,2), the result for the correlation step by step are maxima because of the time shift to the stored Walsh functions W(3,3), which lead to false detection when interpreted as Walsh function W(3,3).

With periodic, i.e. transmission of the data signals one after the other, such disturbing maxima arise at the time shifts t3, t7 and t11, t15, when the signal has not fully filled up the decoder, as shown in Table 8 in FIG. 25.

The calculation of the correlations in the decoder with the chip shifts t3, t7 and t11, t15 results in sidelobes (in Table 8 with height of 32 because of four additions of the calculation of the four correlation sums for the case of N=8 chips): these sidelobes could be falsely detected in the decoder as an AKF main maximum, called "disturbing sidelobes" below.

Symmetry Test

These disturbing sidelobes, arriving before or after the complete filling of the decoder's register with the arriving spread data signal, will be eliminated through calculating the correlations AKF and KKF for an aperiodic transmission instead of a periodic transmission, i.e. the correlation is not implemented with directly following chip sequences, one after the other.

The problem of the disturbing sidelobes in periodic transmission can be eliminated by taking advantage of the symmetry of the positive and negative peaks around the AKF main maximum of the Walsh Sequences, refer to Table 3. Additionally, the sum of the KKF sidelobes W(3,2/W(3, 1), W(3,2/W(3,3) and W(3,2/W(3,4) before and after the synchronous, mid KKF time point (=0) shows an anti-mirror symmetry which is resulting in zero when added.

If the periodic data stream of spread signals, arriving at the decoder, is transferred into an aperiodic data stream, then the decoder delivers the result depicted in table 9 in FIG. 26, where lower values of sidelobes appear in contrary to the correlation of periodic arriving data signals according to Table 8. These lower sidelobes can be eliminated by an additional logic step. Then they will not be falsely interpreted as useful data as shown in Tables 9 and 10.

The symmetry test for calculating the correlation functions within aperiodic transmission is described below.

Figure 27:
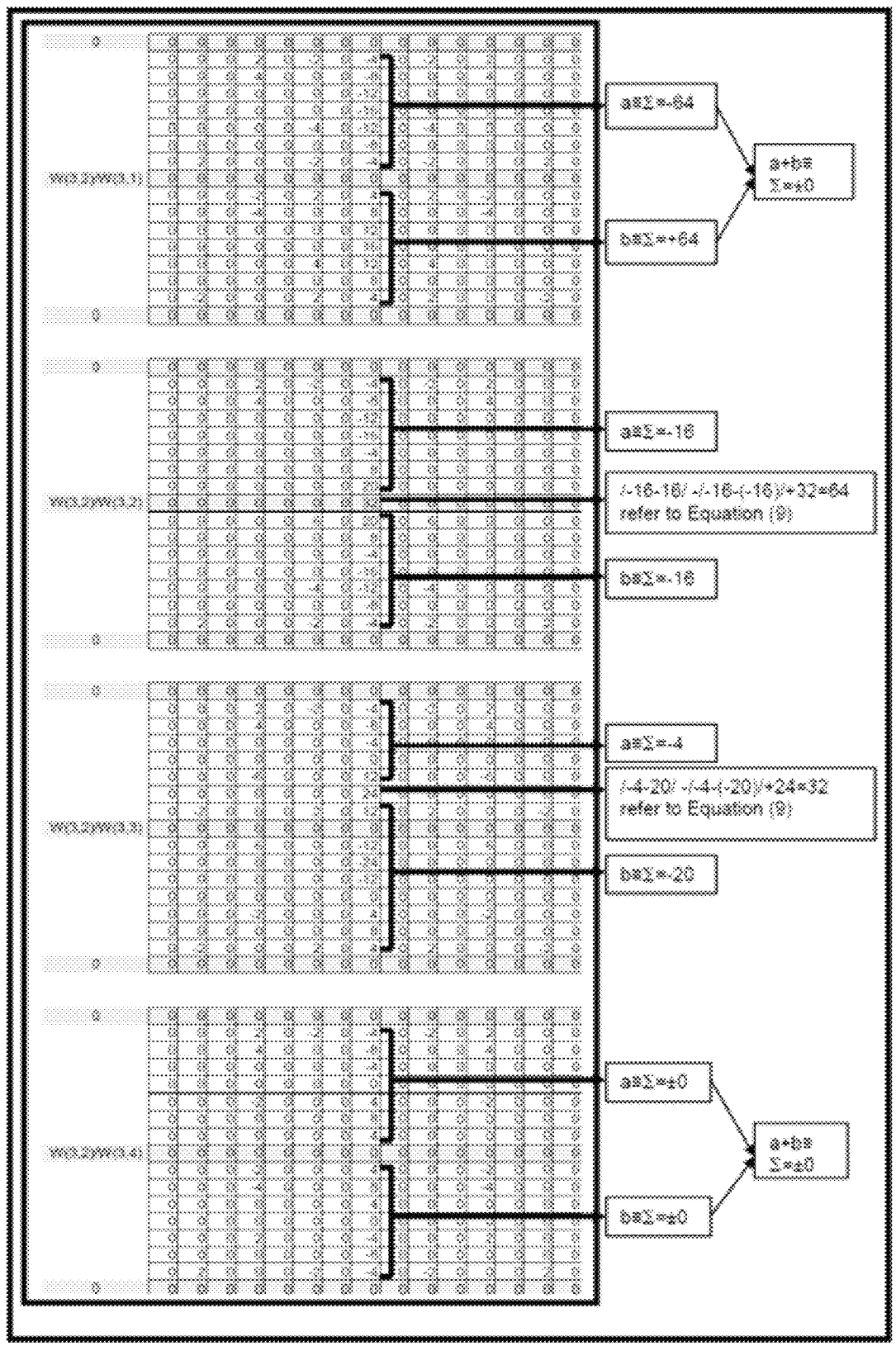
FIG. 27 is a table showing an example of the application of a method, at which the side lobe for the Walsh pairs W(3,2)/W(3,3) has the value of 24 (third matrix in Table 3).

For a sequence with N chips the correlation functions are calculated before and after the maximum of the correlation of the expected user signal (at the chip shift t8); the N−1 preceding and following KF sums for the respective chip step KFti are added (Table 10 in FIG. 27). In the example for N=8 all side lobe results for the chip shifts t1 to t8 (according to the chips fed one after the other into the register) before the maximum are added and all sidelobes shifts t10 to t17 after the maximum to be analyzed are added. This is followed by a threshold detection:

$$\text{Addition including signs of all preceding maxima} = a \quad \text{Equation (7)}$$

$$\text{Addition of all subsequent maxima} = b \quad \text{Equation (8)}$$

A data bit for reception is detected in the decoder if the following logic equation, as test logic, is true:

$$(\text{ABS}(a+b) - \text{ABS}(a-b)) + \text{ABS}(\text{main maximum}) > 4*N \quad \text{Equation (9)}$$

ABS is the respective absolute value.

Table 10 in FIG. 27 shows an example of the application of this method, at which the side lobe for the Walsh pairs W(3,2)/W(3,3) has the value of 24 (third matrix in Table 3). The second matrix in table 3 shows the case that an incoming sequence W (3, 2) is correlated with itself, i.e. when the data signal arrives without time shift; the main maximum for this signal for utilization is 32 at the time t=8.

This method assures that in the case of asynchronous arriving sequences all sidelobes are eliminated while the main maximum is detected with the maximum value of 32 (=4N) for utilization as correct data signal. Even with some errors in the received chips of the data signal, which is supposed to be detected, the threshold term >0 within the formula will result in positive detection. The main maximum here is 32 which equals 4N because of the addition of four correlation results in the method. Hence the relation of main maximum to sidelobes of the Walsh Sequence with a chip length of N=8 now is 8 to zero which is the theoretical maximum as in the synchronous case.

E.g., if the spread data signal, either the correct one or an extraneous neighbor channel signal, arrives with a time shift (against the synchronous case) of 3 chips at the decoder, then the maxima of the correlation in column t8 of table 9 will be shifted about 3 chip shifts.

The term ABS(a−b) in equation (9) eliminates the sidelobes in the AKF in those cases where the mid main maximum is missed with the test logic. The sidelobes around the mid main maximum however are symmetric so the difference (a−b) vanishes, hence <N is also true and the mid main maximum is detected.

The term ABS(a+b) vanishes with cross-correlation, refer to examples W(3,2)/W(3,1), W(3,2)/W3,3) and W(3,2)/W (3,4) in Table 10, while the same term ABS(a+b) contributes the maximum value to the threshold detection, refer to W(3,2)/W(3,2) in Table 10.

The calculation of the threshold is not required if the correlation functions do not contain any maximum value different from zero. Of course, the two signs of the modulation of the bit to be used as code + and −, have to be detected and stored before the absolute value is built.

With the method of the invention, an amount of N−1 Walsh sequences is achieved for the application as orthogonal sequences; the value reduced by 1 originates from W(n,1) which is a constant as a sequence and cannot be used with the presented procedure in the asynchronous, aperiodic case (not surprisingly since there is no information contained in the form of 180°-phase jumps).

Data signals for a continuous, fast data transmission have to be transmitted in periodic mode. The periodic data stream has to be transferred into a aperiodic sequence according to the above described calculation for the elimination of extraneous signals (from neighbor intracell channels). This is accomplished with the following circuit design, refer to FIG. 14 which will be described in the following:

After the transmission of a data signal (step 102 in FIG. 1), spread with a Walsh Sequence of chip length N, the digital data stream is fed alternately into shift registers 22 and 27 in two groups of N chips each through clocked branching 20. The synchronization clock pulse (N times t1) of the clock synchronization 21 for the switching of branching 20 can be extracted from an initialization synchronization of the decoder. The synchronized branching clock 20 generates two data streams as in the following example:

A periodic data stream, arriving at the branching 20 (where one after the other the spread data signals of N chips each arrive)

1 1 1 1 −1 −1 −1 −1 1 1 1 1 −1 −1 −1 −1 1 1 1 1 −1 −1 −1 −1 is split in the upper part of the branch into a data stream for the register 22

1 1 1 1 −1 −1 −1 −1 1 1 1 1 −1 −1 −1 −1 and in the lower part into a data stream for the register 27
1 1 1 1 −1 −1 −1 −1
For the example of synchronous transmission, it is assumed that guard intervals are eliminated upfront.

Now the correlation functions are calculated in the correlation modules 23 and 28 for the two data streams out of the shift registers 22 and 27.

The resulting bit sequence out of the correlation values, depicted in Table 9 in the mid column is now given to the chip clocks 25 and 29 which are synchronized with the clock synchronization 24. The clocks 25 and 29 feed the decision modules 26 and 30. The decision modules decide according to equation (9) whether the respective data signal is a usable bit or an interfering signal, which is created through a runtime shift or whether it is an extraneous intracell signal. The decision modules can be implemented as hardware or software modules.

The result of the decision modules 26 and 30 is then combined to a continuous data stream through the clock synchronization 31, which is controlled by the clock synchronization 21 with trigger time t1.

The splitting of a data stream containing continuous, periodic transmitted sequences of N chips into two data streams of N chips each, which are displaced against each other (about the length of a spread data signal, respectively according to the time interruption of N*ti) enables the calculation of aperiodic correlation functions; hence this method eliminates extraneous intracell signals also if the transmission is continuous and periodic.

The periodic incoming data stream of spread data signals can be also split into more than two data streams for which the correlations will be calculated in parallel. Also possible is an intermediate buffering of the incoming data and the corresponding displaced read out for the aperiodic calculation of correlations.

The method according to the invention thus offers the possibility for asynchronous applications of the CDMA method which is not possible with the existing Gold codes.

With regard to signal processing, the method according to the invention is not complex. The corresponding decoder can be implemented in hardware or software. The necessary operations are related to shift operations (AKF and KKF in the time domain), change of sign, additions and multiplications. These operations all can be realized in INTEGER format. The additional effort for the method is minor in comparison to adaptive equalizers. Likewise the sophistication is low compared to voice codecs. The method according to the invention thus does not only reduce disturbances and losses in the data transmission but also latencies and delays. Both reductions serve to increase the bandwidth for the fast data transmission.

LIST OF REFERENCE DESIGNATORS

1 Branching device
2 Shift register
3 Multiplication filter
4 and 5 Shift register
6 Multiplication filter
7 Shift register
8 Summation filter
KF1 Correlation filter 1
KF2 Correlation filter 2
KF3 Correlation filter 3
KF4 Correlation filter 4
9 Shift register
10 Multiplication filter
11 Branching device
12 Shift register
13 Multiplication filter
14 and 15 Shift register
16 Multiplication filter
17 Shift register
18 Summation filter
KF5 Correlation filter 5
KF6 Correlation filter 6
KF7 Correlation filter 7
KF8 Correlation filter 8
20 Branching device
21 Synchronization clock N*t1
22 Shift register
23 Correlation module
24 Synchronization clock t1
25 Clock
26 Decision module
27 Shift register
28 Correlation module
29 Clock
30 Decision module
31 Clock
32 Shift register Super-Orthogonal Method Further improvements for de-spreading of data signals spread using Walsh sequences are described hereafter, namely an improved symmetry test and an improved conjunction test. These embodiments achieve optimal decoding results and are based on the aperiodic decoder of FIG. 14 and the method steps of FIGS. 10A, 10B, wherein incoming chip sequences are split to apply auto and cross correlations to each data stream.

Aperiodic Data Stream

For DS-CDMA transmission the most relevant case is a continuous periodic data stream which implies a stream of Walsh sequences arriving one after the other at the decoder. In the following example the data stream is spread with the 8-chip Walsh Sequence

W(3,2)=1 1 1 1 −1 −1 −1 −1.

Optimal decoding results according to the super-orthogonal method are achieved if the stream of Walsh sequences contains the corresponding number of $2^n$=N zeros between each Walsh sequence W(n,m). In the example of W(3,2) the resulting sequence with added $2^3$=N zeros is:

| 1 | 1 | 1 | 1 | −1 | −1 | −1 | −1 | 0 | 0 | 0 | 0 | 0 | 0 | 0 | 0 |

The stream of Walsh sequences with embedded zeros will be referred to as continuous aperiodic data stream. The use of embedded zeros, or "split intervals" is in particular advantageous for the asynchronous case where the transmitter and the receiver are not synchronized. This situation occurs e.g. in continuous periodic data streams that are transmitted from a mobile station uplink to a base station. A split interval suitable for this asynchronous detection is N chips. The split intervals (i.e. the sequence of zeros) can be inserted into the data stream by the transmitter. Within the split interval the power of the signal should be switched to zero. This is similar to the guard intervals introduced in the LTE standard to separate the orthogonal multiple frequencies of the OFDMA method. As an alternative the split intervals can be inserted in the receiver by substituting guard intervals.

To transmit e.g. binary user bits L, L, 0 the continuous aperiodic data stream arriving at the receiver in spread form for asynchronous detection is thus:

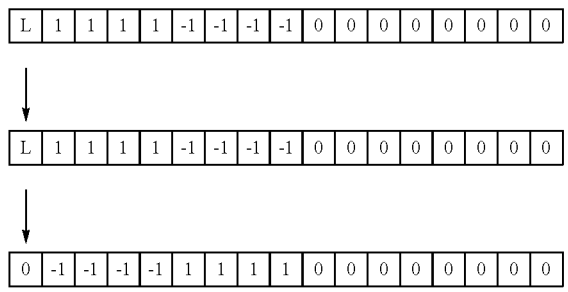

The decoder in the receiver has to detect the Walsh sequence W(3,2) in the incoming continuous aperiodic data stream as the signature sequence that represents the user bits L,L,0 both in the synchronous case and the asynchronous case.

Figure 14:
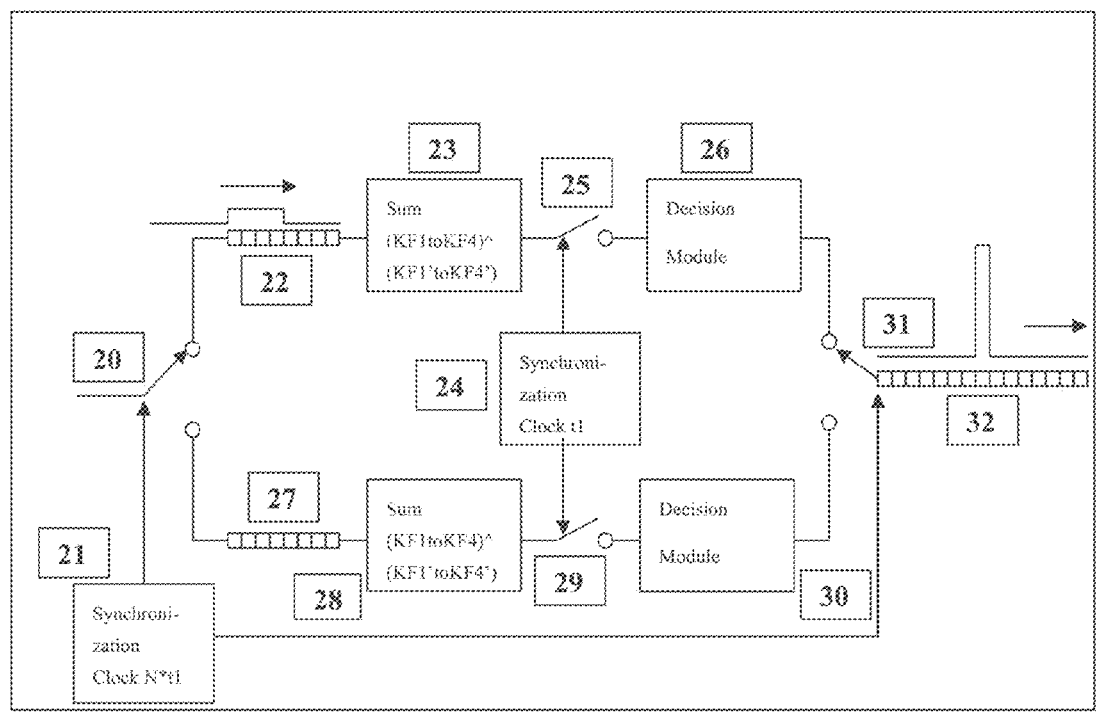
FIG. 14 shows a schematic of a decoder of the invention for de-spreading of signals spread with Walsh sequences by applying apparatus according to FIGS. 11A and 11B or FIGS. 12A and 12B.

For the following example it is assumed that the decoder of FIG. 14 is synchronized with the transmitter and receives this continuous aperiodic data stream chip by chip. The continuous aperiodic data stream is split into two streams in the upper and lower branch after each time 1 Tb, 2 Tb, 3 Tb (Tb being the time to receive 8 chips).

The aperiodic correlation algorithm of FIG. 14 then detects in the upper branch with register 22 after the time 1 Tb (8 chips) the signature+W(3,2) for bit L:

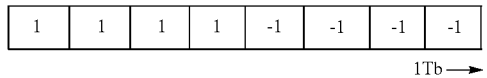

The lower branch with register 27 detects after 2 Tb:

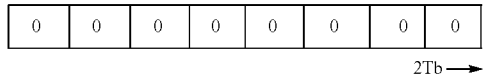

The upper branch detects after 3 Tb the signature W(3,2) for bit L:

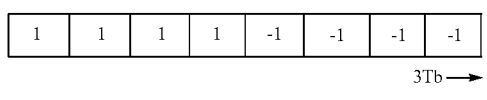

After 5 Tb the upper branch detects the signature—W(3,2) for bit=0:

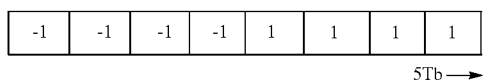

In the case of synchronous detection of the continuous aperiodic data stream, the decoder of FIG. 14 thus recognizes the transmitted Walsh sequences correctly also in the presence of embedded zeros.

The following example describes the case of asynchronous detection wherein the sequences in a continuous aperiodic data stream arrive at the receiver with time shifts.

Assuming a sequence shifted by one chip step $-1*t1$, the following data stream will arrive at the decoder of—FIG. 14:

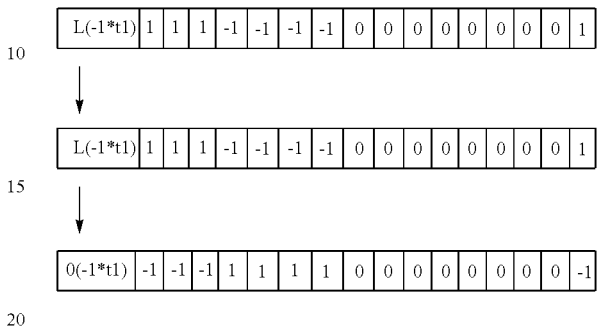

After times 1 Tb, 3 Tb, 5 Tb register 22 in the upper branch thus contains, respectively

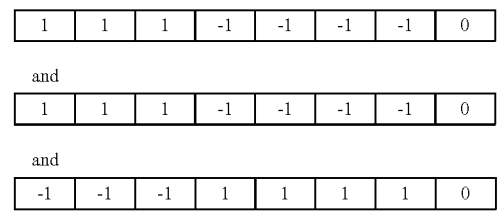

and after times 2 Tb, 4 Tb, 6 Tb register 27 in the lower branch contains

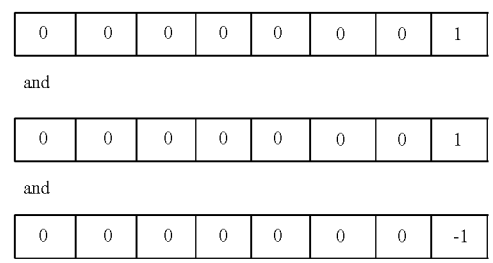

As a second example a user bit sequence of L,L,0 of a neighbor channel coded with Walsh sequences W(3,2) with the time shift of $-2*t1$ would result in the following chip sequences in registers 22 and 27:

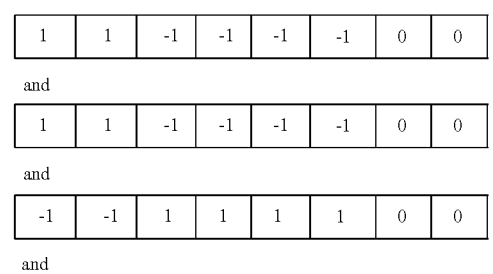

and

-continued

| 0 | 0 | 0 | 0 | 0 | 0 | 1 | 1 | and

| 0 | 0 | 0 | 0 | 0 | 0 | 1 | 1 | and

| 0 | 0 | 0 | 0 | 0 | 0 | -1 | -1 |

These chip sequences are no longer Walsh sequences but truncated parts of a Walsh sequence—perfect asynchronous detection can only be achieved if all partial cross-correlation functions for these truncated chip sequences also have zero results. As will be shown later, this is achieved without any previous channel information by using a continuous aperiodic data stream sequence wherein each Walsh sequence is followed by N zeros.

In an alternative the continuous aperiodic data stream can be split with only four embedded zeros; in the asynchronous case this shorter bit stream can be correlated in a shorter time compared to a embedding N zero chips with no information ([6] H.-H. Chen, p. 285).

In the asynchronous case and a shift by one chip time, two consecutive bits L, L split with four zeros (even case) will arrive at the decoder in the following, truncated form

| 1 | 1 | 1 | -1 | -1 | -1 | -1 | 0 | 0 | 0 | 0 | 1 | 1 | 1 | 1 | -1 | and two consecutive bits L, 0 split with four zeros (odd case) will arrive at the decoder in the following, truncated form

| 1 | 1 | 1 | -1 | -1 | -1 | -1 | 0 | 0 | 0 | 0 | -1 | -1 | -1 | -1 | 1 |

This chip sequence can be decomposed in four parts of four chips, each part being processed by a four-chip cross correlation circuit as shown in the following tables:

| 8-bit correlator for W(3,2) | | 8-bit correlator for W(3,2) after time T | |
|---|---|---|---|
| 1 1 1 -1 -1 -1 -1 0 | | 0 0 0 1 1 1 1 -1 | |
| 4-bit correlation 1 KKF1 | 4-bit correlation 2 + KKF2 | 4-bit correlation 1' KKF1' | 4-bit correlation 2' + KKF2' |
| = 8-bit KKF | | = 8-bit KKF' | | in the even case (L follows L) and

| 8-bit correlator for W(3,2) | | 8-bit correlator for W(3,2) | |
|---|---|---|---|
| 1 1 1 -1 -1 -1 -1 0 | | 0 0 0 -1 -1 -1 -1 1 | |
| 4-bit correlation 1 KKF1 | 4-bit correlation 2 + KKF2 | 4-bit correlation 1' KKF1' | 4-bit correlation 2' + KKF2' |
| = 8-bit KKF | | = 8-bit KKF' | | in the odd case (0 follows L).

Here, instead of using the complete 8-bit correlation circuit for the Walsh sequence W(3,2), the cross-correlations and auto-correlations are calculated first with two separate 4-bit correlations W(2,2) to then add the partial 4-bit correlations to obtain the 8-bit correlation KKF.

For the sequences −1,−1,−1, 0 and 0,0,0,1 and 0, 0, 0, −1 it has been shown by computer calculations that all partial or truncated cross-correlations vanish.

For the sequences 1,1,1,−1 and −1,−1,−1,1—which are not Walsh sequences—the invention has found that their cross-correlations with all possible 4-bit Walsh sequences of order 2 (i.e. W(2,i)) and all possible time shifts in asynchronous detection are zero if the improved symmetry test is applied which is described in the following.

Thus perfect asynchronous CDMA mode detection can be achieved by aperiodically calculating 4-bit partial correlations in a chip sequence with a split of only four embedded zeros.

Improved Symmetry Test

The symmetry test described above in relation to step 106 of FIG. 10A and the circuit shown schematically in FIG. 14 eliminates unwanted side lobes caused by asynchronous disturbances. The symmetry test applies equation (9) to the side lobes of the correlation functions KFz of FIG. 10 preceding and following the mid-maximum of the correlation of the expected user signal, $$(ABS(a+b)-(ABS(a-b))+ABS(\text{main maximum}) > 4*N \quad \text{Equation (9)}$$

In the symmetry test of equation (9) four correlations of the Walsh sequences are summed. All side lobes are thereby eliminated for the synchronous case; however side lobes are not completely eliminated for the asynchronous case.

The improved symmetry test accelerates the calculation of the correlation functions by applying the test already in a modified step 105a shown in FIG. 18A to the correlation function CF1 as follows:

$$\text{For CF1DS}/W(n,m):(ABS(a+b)-ABS(a-b))+ABS(\text{mid}) \geq N \quad \text{Equation (9a)}$$

All N−1 preceding and following CF sums for the respective chip step CFti are added. The modified equation (9a) of the improved symmetry test is thus applied to the first correlation CF1 of W(n,m) and W(n,m)' individually rather than only after having summed, in step 106, all four correlation results; therefore the right side of equation (9a) has to be N instead of 4N in equation (9). The calculation process is thereby simplified and accelerated since an incoming chip sequence would be immediately terminated if the improved symmetry test performed in step 105a is not satisfied.

For a perfect decoding result without any side lobes also the correlation function CF2 of the complementary Walsh sequence W(n,m)' has to be subjected to the improved symmetry test, namely $$\text{For CF2DS'}/W(n,m)':(ABS(a+b)-ABS(a-b))+ABS(\text{mid}) \geq N \quad \text{Equation (9b)}$$

A user data bit is detected in the decoder if equations (9a), 9(b) are satisfied. The calculation of the threshold $\geq N$ is of course not required if the correlation functions do not contain any maximum value (i.e. are all zero). The correlation functions CF1 and CF2 of FIG. 18A correspond to the correlation functions KF1 and KF2 of FIG. 10A.

Figure 10A:
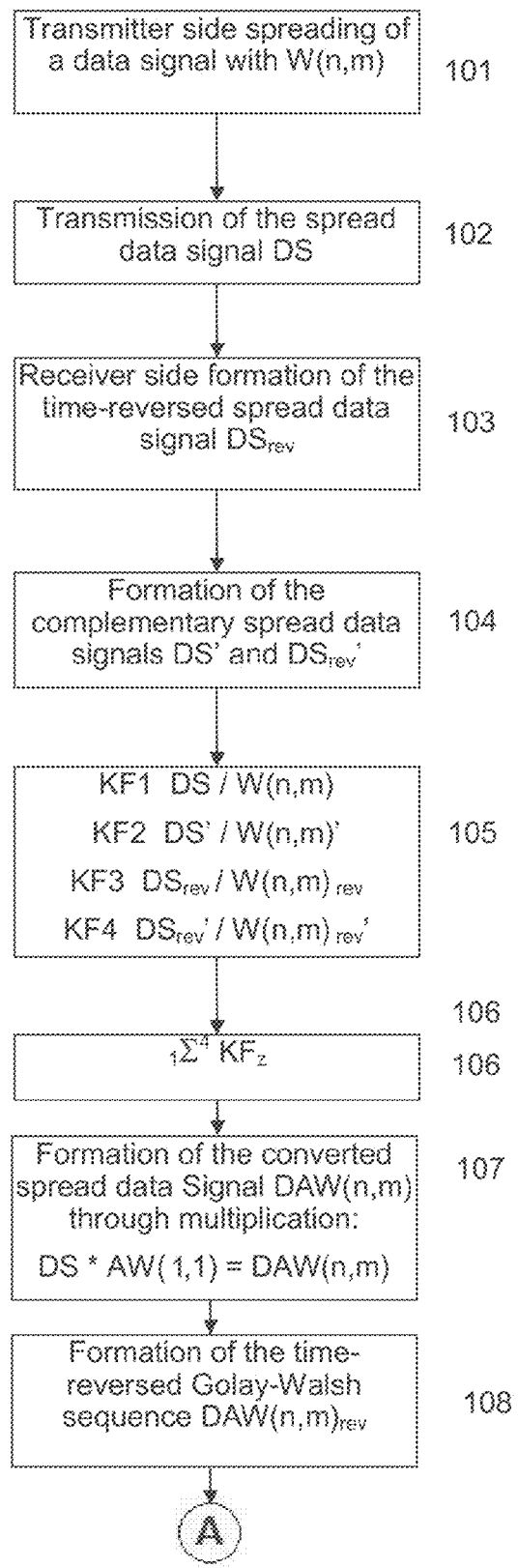
FIGS. 10A and 10B show a flow diagram in which a method for the de-spreading of a spread data signal is depicted according to the second embodiment.
Figure 10B:
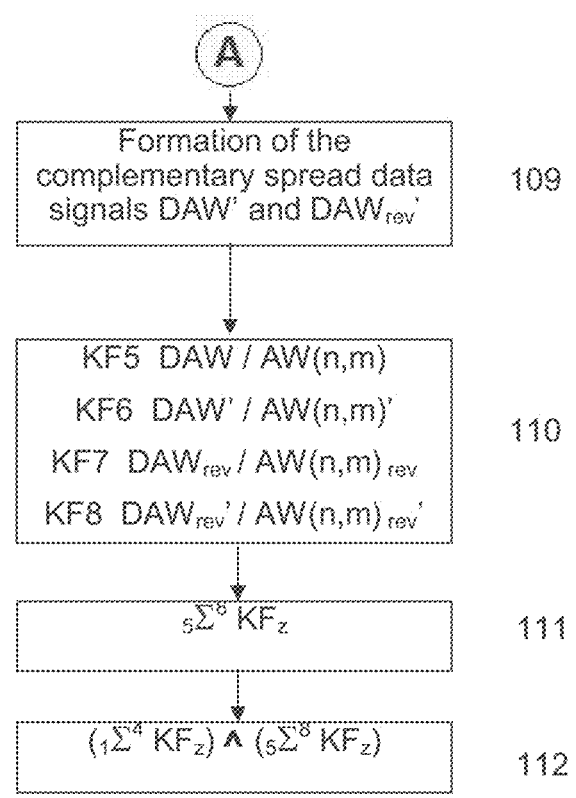
Figure 11A:
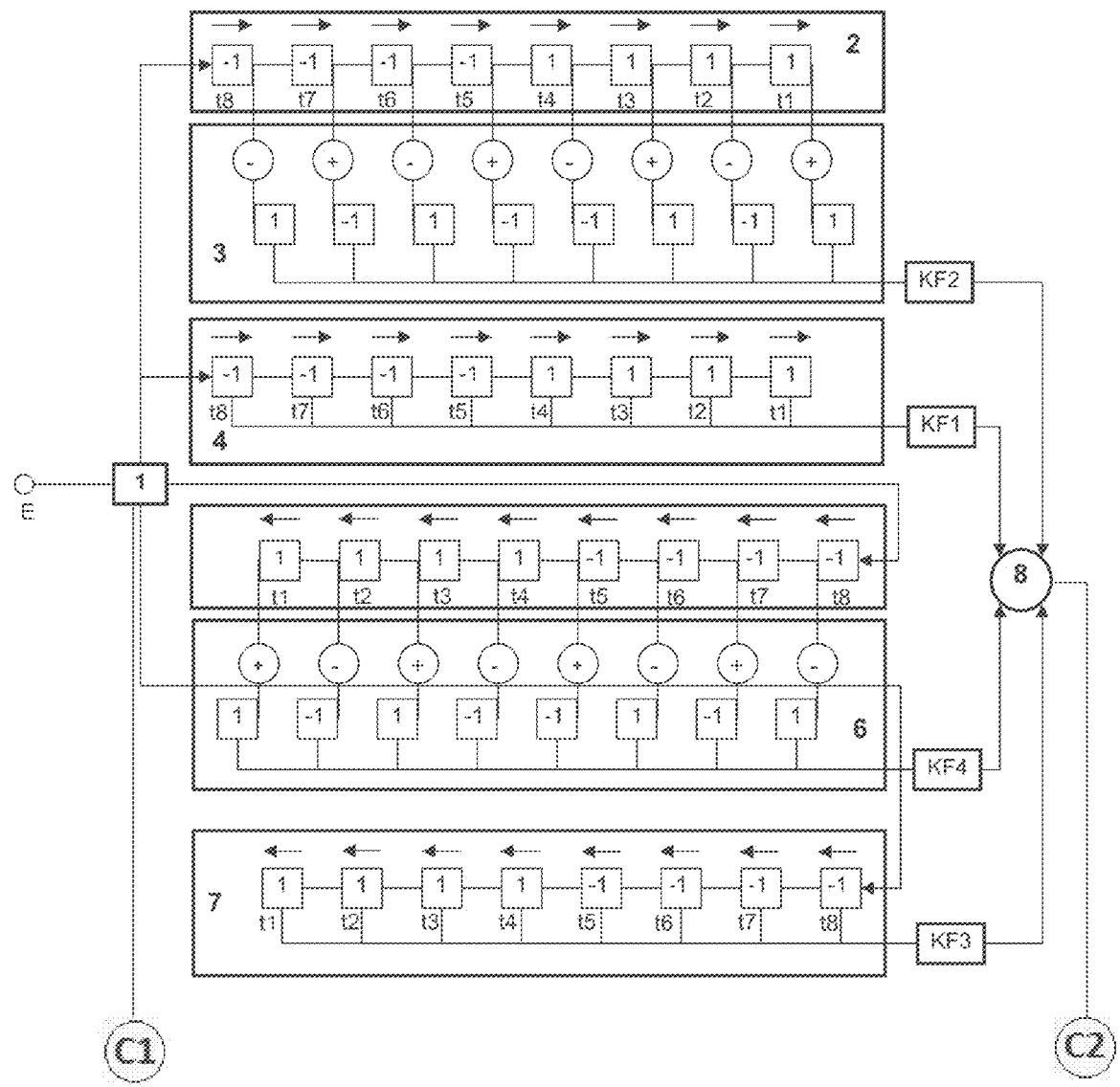
FIGS. 11A and 11B schematically show a first realization of an apparatus for performing the method of the second embodiment according to FIGS. 10A and 10B.
Figure 11B:
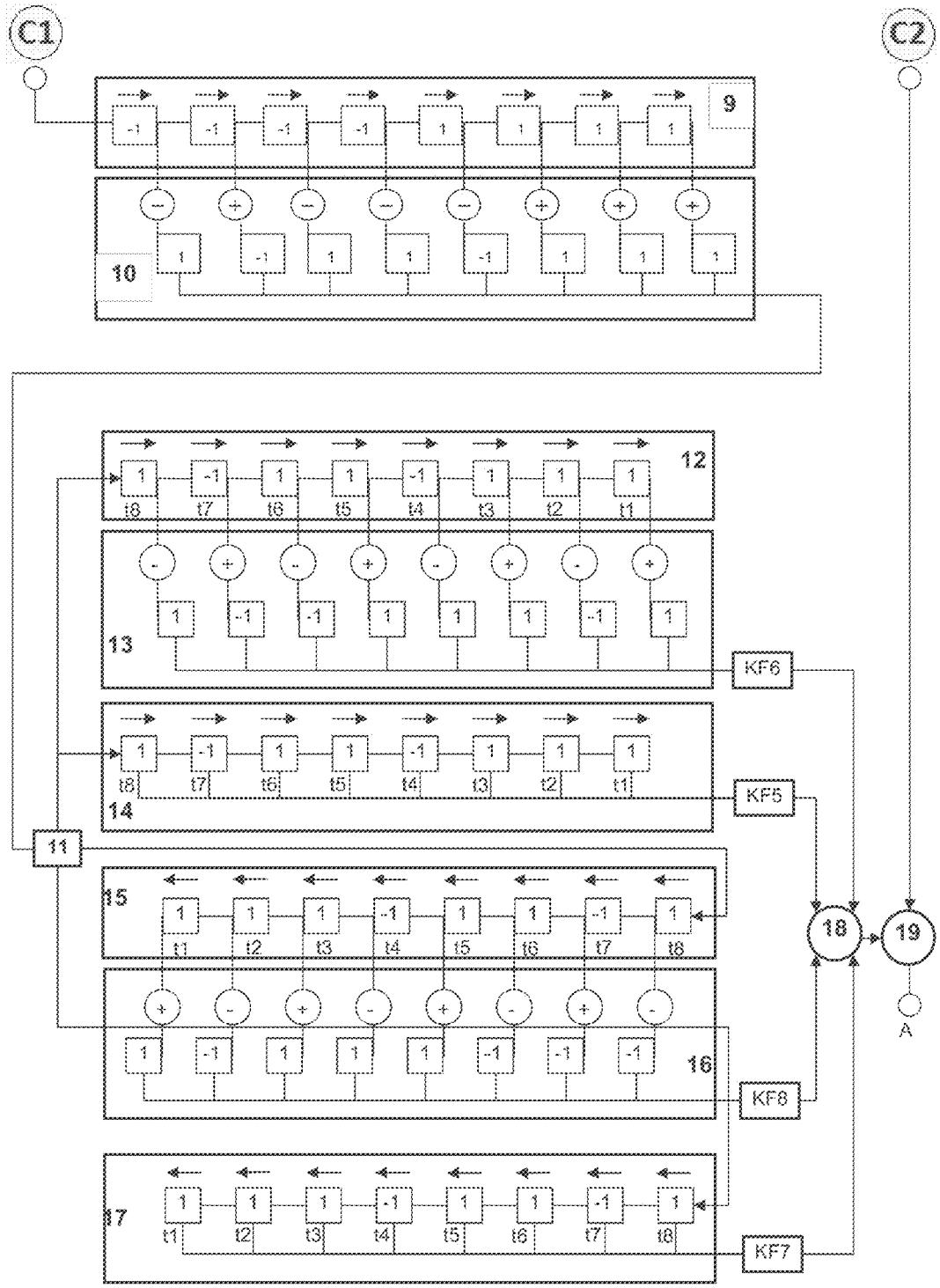
Figure 12A:
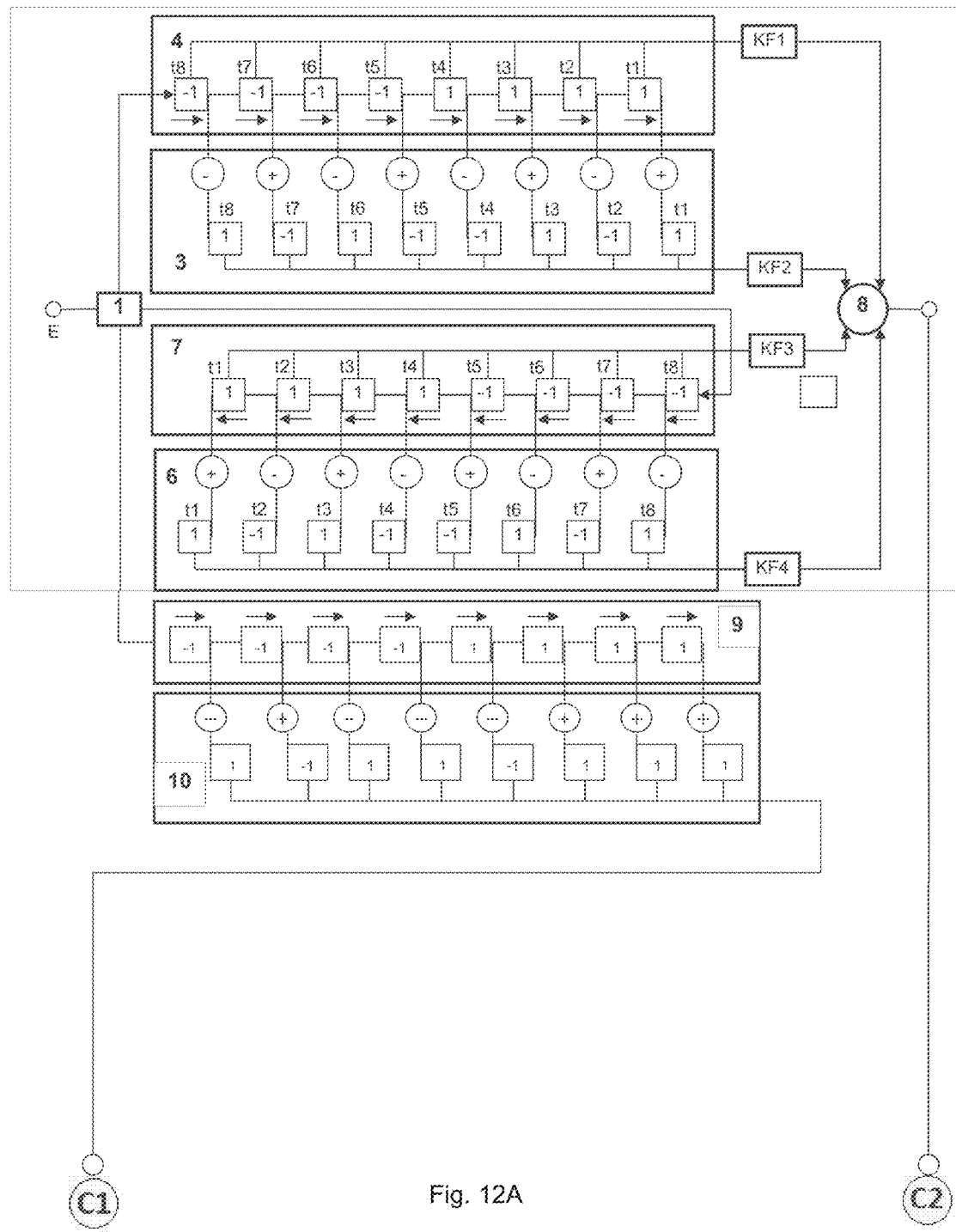
FIGS. 12A and 12B schematically show a second realization of an apparatus for performing the method of the second embodiment according to FIGS. 10A and 10B.
Figure 12B:
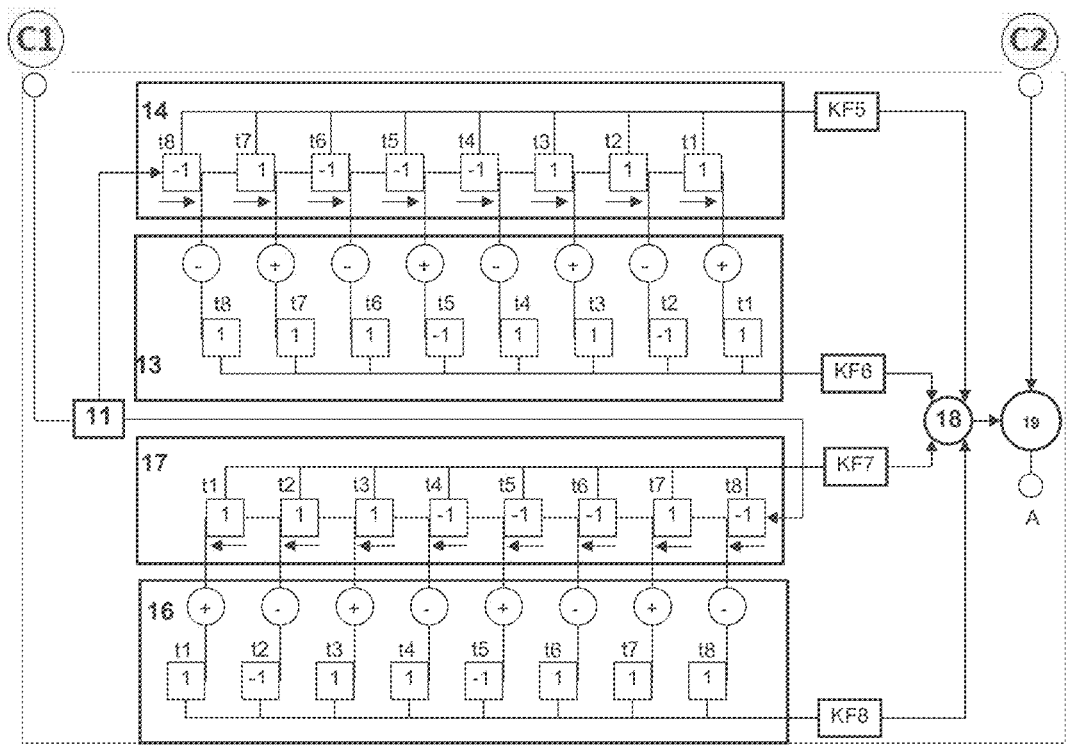

The improved symmetry test eliminates the summation of correlations in step 106 of FIG. 10A.

Figure 15A:
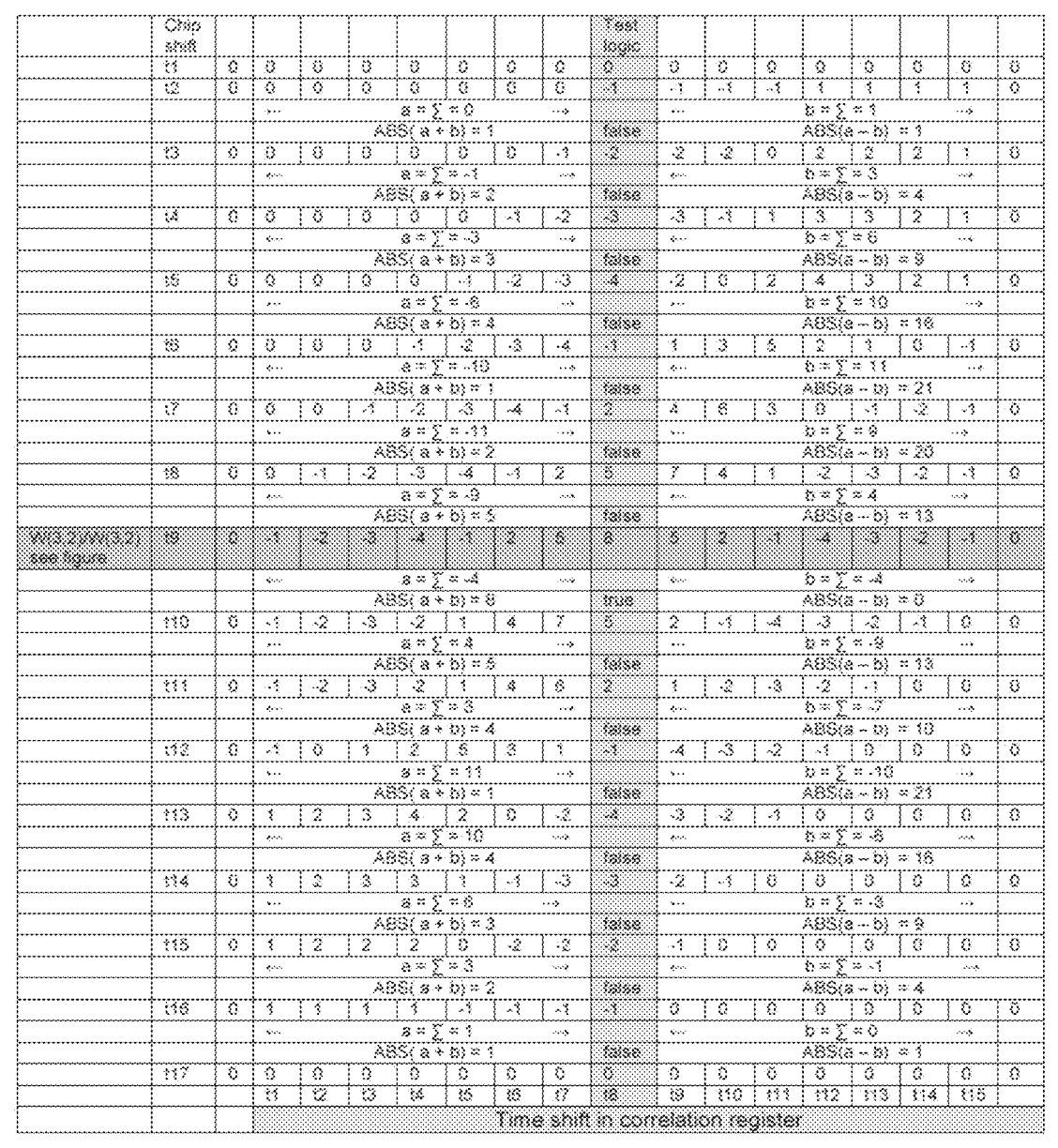

FIG. 15A illustrates the results of the improved symmetry test in accordance with equation (9a) applied to the auto-correlations W(3,2)/W(3,2) of a synchronized incoming Walsh sequence W(3,2) at different chip shifts ti.

As shown in FIG. 15A the maximum value of 8 of the symmetry test appears at chip time t9, i.e. after the complete Walsh sequence has filled the correlation filters at chip time t8. The result of the correlation functions at chip times preceding t8 are −1, −2, −3, −4, −1, 2 and 5, so that a=−4; the result of the correlation functions following chip time t8 are 5, 2, −1, −4, −3, −2, −1, so that b=−4.

At chip times other than t8, the symmetry test yields results <8 and thus indicates the absence of a user bit.

It is to be noted that the sum ABS(a+b) also has the value of 8, whereas the difference ABS(a−b) equals zero. The symmetry test result is thus equal to the main maximum of the autocorrelation function at chip time t8. The autocorrelation maximum is thus calculated from the height of the side lobes at t8 as a result of the symmetry of the Walsh sequences.

Figure 15B:
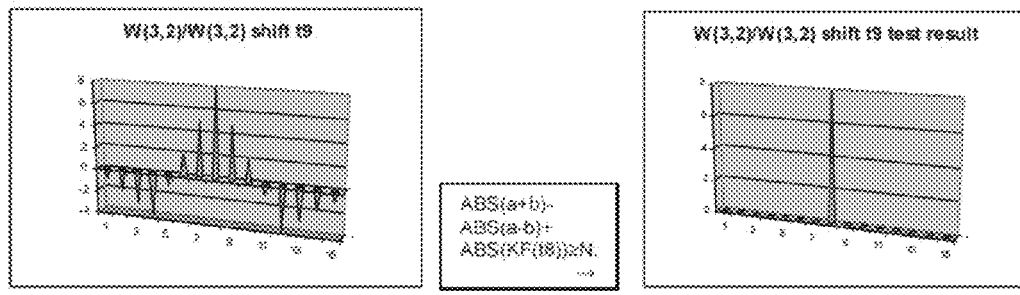
FIG. 15B is a graphical representation of the results illustrated in FIG. 15A.

FIG. 15B is a graphical representation of the results illustrated in FIG. 15A.

Figures 16A, 16B:
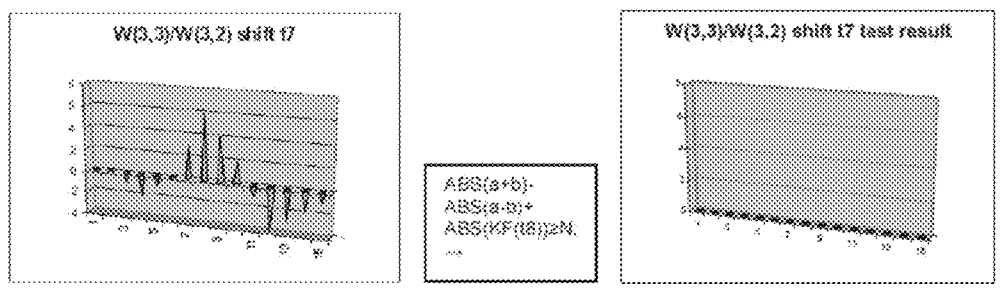
FIG. 16A illustrates the results of the improved symmetry test in accordance with equation (9a) applied to the cross-correlations W(3,2)/W(3,1), according to an embodiment.
FIG. 16B is a graphical representation of the results illustrated in FIG. 16A.

FIG. 16A illustrates the results of the improved symmetry test in accordance with equation (9a) applied to the cross-correlations W(3,2)/W(3,1). The results of the improved symmetry test at all chip shift times are zero so that all side lobes are suppressed, as illustrated graphically in FIG. 16B.

The first term ABS(a+b) in the symmetry test contributes the maximum mid value to the threshold detection of the auto correlation function for the utilization signal; the term ABS(a−b) provides for the vanishing of the side lobes in both auto and cross correlation.

The improved symmetry test of equations (9a) and (9b) eliminates all side lobes in the case of synchronous transmission and detects the main maximum with maximal value (N=8) as the user signal—this is the ideal value for the correlation filter in order to achieve the perfect threshold detection in CDMA decoders.

The improved symmetry test eliminates the side lobes of most cross correlations in the case of asynchronous transmission. Remaining side lobes are eliminated by the Super-orthogonal correlation method described in the following wherein an improved conjunction logic exploits symmetry characteristics of Golay and Golay Walsh sequences.

Improved Conjunction Test

The following discloses an improvement of the conjunction test described above in relation to steps 107 to 112 in FIGS. 10A, B for the case of synchronous reception.

The conjunction test compares (step 112) sums of correlation functions KF's of received Walsh sequences DS and their corresponding Golay-Walsh sequences DAW and thereby cancels the side lobes in case of synchronous reception in that it relies primarily on the conjunction of their two correlation results W(i,j)/W(i,j)=value 1 and AW(i,j)/AW(i,j)=value 2, namely AND(value1<>0,value2<>0,value1=value2)=true The third term in this conjunction formula is only true if the whole Walsh sequence is received without any chip shift and the AKF is detected with no chip shift, namely synchronously. Only then the resulting maximum AKF value of the Walsh sequence equals exactly the AKF value of the Golay-Walsh sequence, namely the mid-maximum, to generate the user signal. On the other hand, correlations with asynchronously received, i.e. chip shifted sequences or extraneous sequences are rejected because their correlation values differ and thus cancel by the AND function.

The following discloses an improved method and structure for the conjunction test wherein an additional AND conjunction is applied to correlation functions to cancel all cross-correlations and side lobes and thereby to optimize the conjunction test also for asynchronous, i.e. time-shifted transmission.

Figure 17:
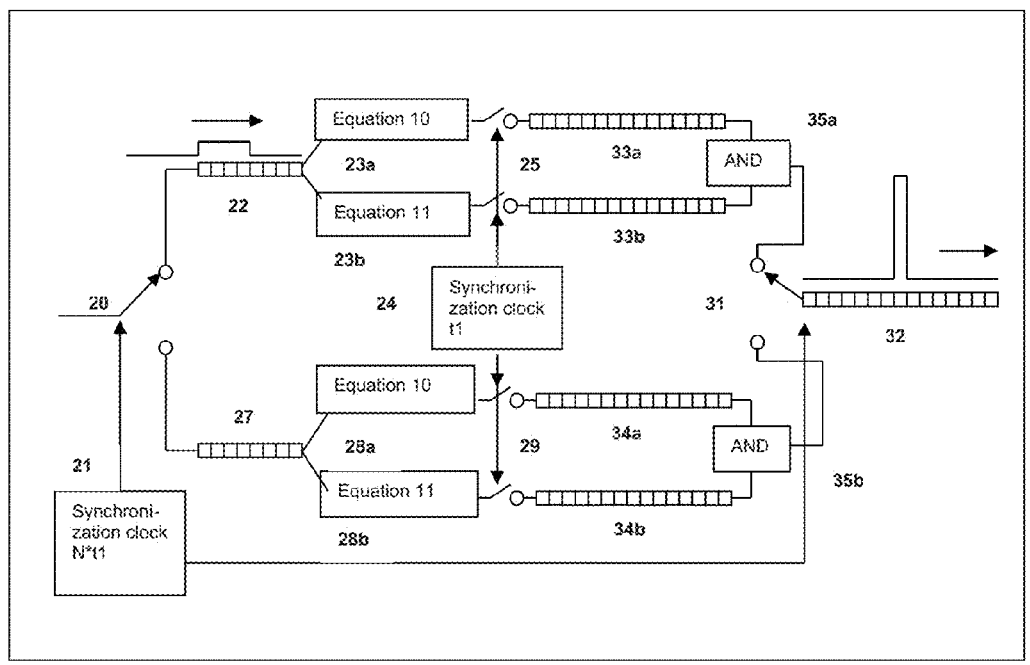
FIG. 17 illustrates a schematic representation of a circuit arrangement for implementing the improved conjunction test described herein, according to an embodiment.

A circuit arrangement for implementing the improved conjunction test is shown schematically in FIG. 17 which is based on FIG. 14 and identifies corresponding components with the same reference numerals.

Figure 18A:
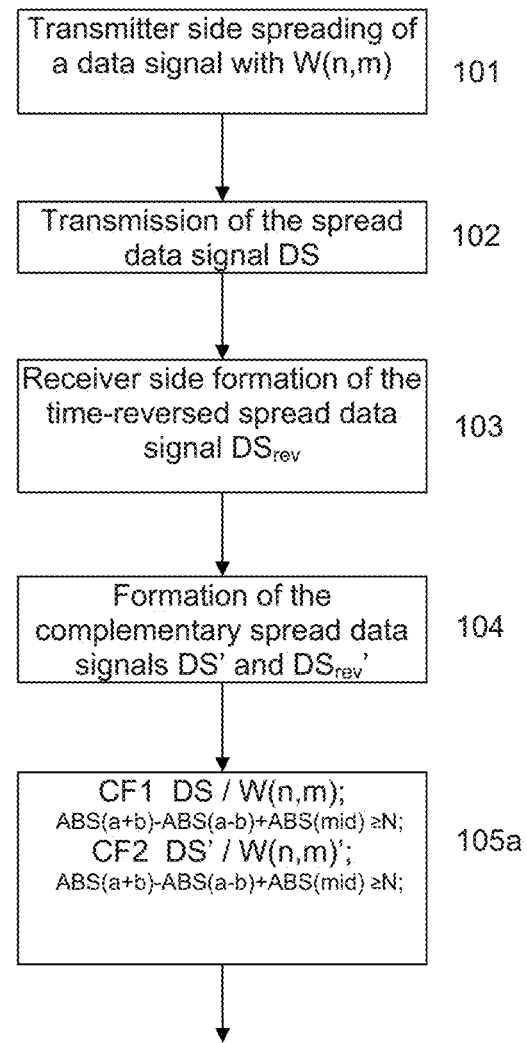
FIGS. 18A and 18B show a schematic flow diagram of the super-orthogonal method for de-spreading of a Walsh sequence, according to an embodiment.
Figure 18B:
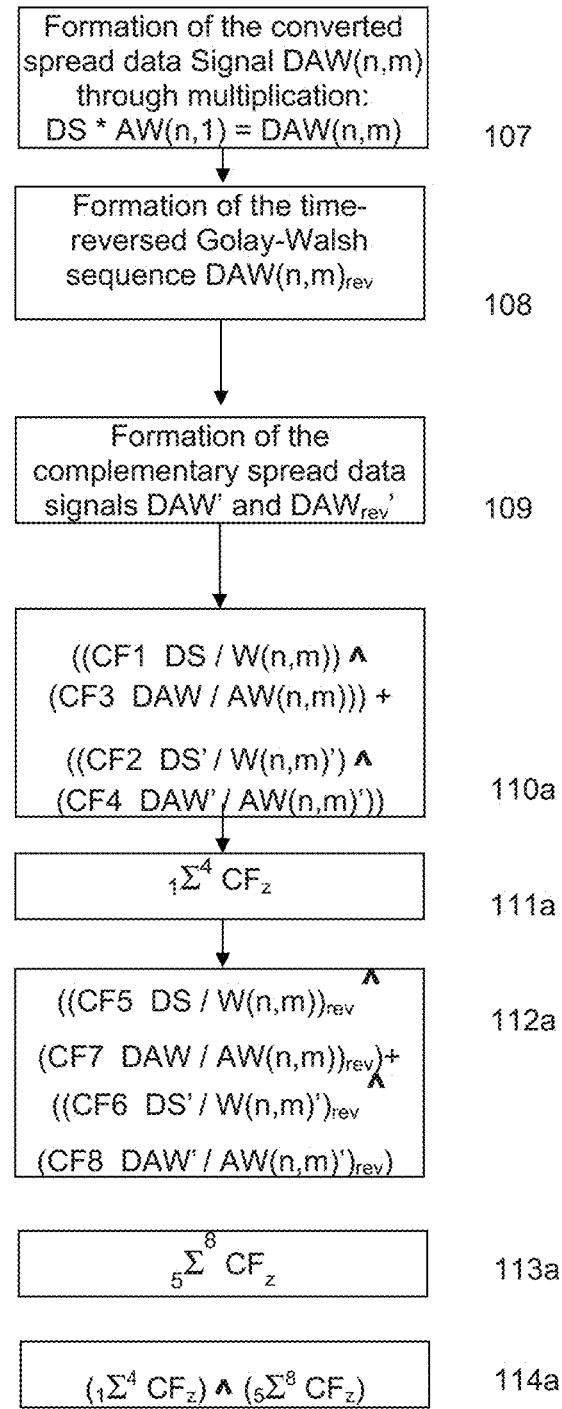

FIGS. 18A, 18B show a schematic flow diagram of the super-orthogonal method for de-spreading of a Walsh sequence. FIG. 18 are based on FIG. 10 and show the same reference numerals for corresponding steps. With respect to step 107 in FIG. 10A and in FIG. 18B the invention has found that the converted spread data signal DAW(n,m) can be obtained by multiplying the received spread data signal DS with any Golay sequence AW(n,m) and not only with the sequence AW(n,1). Details of Golay sequences are described in the article Complementary Sequences by M. J. E. Golay in IRE Transactions on Information Theory, vol. IT-7, April 1961, p. 109.

Referring to FIG. 17, branching device 20 splits the incoming continuous aperiodic data stream as defined in the above section "Aperiodic Data Stream" into aperiodic chip sequences in N bit shift registers 22 and 27 of the upper and lower branch of the decoding circuit in FIG. 17, respectively. Branching device 20 is controlled by synchronization clock 21 with a period of N chip times t1.

The upper and lower branch comprise modified correlation modules 23a, 23b and 28a, 28b, respectively, to calculate the correlation sums for the incoming chip sequence DS. Correlation function CF1 calculates the correlation of the incoming chip sequence DS with the stored Walsh Sequence W(n,m). Correlation function CF3 calculates the correlation of the Golay-Walsh sequence DAW(n,m) derived from the incoming chip sequence DS with the stored Golay-Walsh sequence AW(n, m). The two correlation results CF1 and CF3 are logically connected with an AND function.

In parallel thereto, the incoming data stream DS is alternately multiplied with +1, −1 to form complementary sequences DS' and DAW' which are then correlated with the stored complementary sequences W'(n,m) and AW'(n,m), resulting in correlation functions CF2 and CF4. The result of correlations functions CF2 and CF4 is then logically connected by AND.

According to step 110a the result of the calculations (CF1ˆCF3) is then summed with the result of calculations (CF2ˆCF4).

Modified correlation modules 23b, 28b comprise correlation functions CF5, CF6, CF7, CF8 (equivalent to CF1, CF2, CF3, CF4) to calculate in parallel corresponding correlations for the time reversed chip sequences $DS_{rev}$, $DAW_{rev}$, $DS_{rev}$ and $DAW_{rev}$ according to step 112a.

The modified correlation module 23a thus implements the following equation 10 in the upper branch:

$$((CF1(DS/W(n,m))\hat{}(CF3(DAW/AW(n,m)))+((CF2(DS'/W(n,m)')\hat{}(CF4(DAW'/AW(n,m)')).$$

The modified correlation module 23b thus implements the following equation 11 in the upper branch:

$$((CF5(DS/W(n,m))_{rev}\hat{}(CF7(DAW/AW(n,m))_{rev})+((CF6(DS'/W(n,m)')_{rev}\hat{}(CF8(DAW'/AW(n,m)')_{rev})$$

Correspondingly modified correlation module 28a and 28b implement equations 10 and 11 for the lower branch.

The results of modified correlation modules 23a, 23b of the upper branch are then entered chip by chip into 2N−1 shift registers 33a, 33b, respectively, using synchronized switch 25 which is controlled by synchronization clock 24 with a period of one chip time t1. Correspondingly the results of modified correlation modules 28a, 28b of the lower branch are then entered chip by chip into 2N−1 shift registers 34*a*, 34*b*, respectively, by synchronized switch 29, which is also controlled by synchronization clock 24.

Shift registers 33*a* and 34*a* implement step 111*a* of FIG. 18B and shift registers 33*b* and 34*b* implement step 113*a* of FIG. 18B for the upper and lower branch respectively.

The output of the shift registers 33*a*, 33*b* is input to AND-circuit 35*a* to combine the results of modified correlation modules 23*a* and 23*b*, namely the AND-ed correlations of Walsh Sequences and Golay-Walsh Sequences and the correlations of the AND-ed respective reverse sequences.

Correspondingly the outputs of shift registers 34*a*, 34*b* are input to AND-circuit 35*b* to combine the results of modified correlation modules 28*a*, 28*b* of the lower branch. AND-circuits 35*a*, 35*b* implement step 114*a* of FIG. 18B for the upper and lower branch, respectively.

The synchronized switch 31, controlled by the Nt1 synchronization clock 21, combines the output of the AND circuits 35*a*, 35*b* in the upper and the lower branch, respectively, into a continuous output data stream in register 32. The output data stream shows perfect autocorrelation peaks AKF after every N chips if a correct Walsh sequence fills the register only in case of exact synchronization or a zero cross correlation in case of extraneous signals with different signature sequence.

Referring to FIG. 18A, the modified symmetry test of equations (9a), (9b) is applied already in step 105*a* to the first correlation results of DS/W(n,m) and DS'/W(n,m)' and thus accelerates the de-spreading process since at most two correlation functions are calculated (instead of four correlations functions according to equation 9). If one of equations 9a or 9b is not satisfied, no user data bit is present and the further calculations are discontinued.

FIG. 19A illustrates an example of the improved decoding method implemented in the decoding circuit of FIG. 17 when a Walsh sequence W(3,2) with 8 embedded zeros arrives with a delay of one chip time t1 against the synchronous case. Upper register 22 will then contain at chip time 1*t1 the sequence

| 1 | 1 | 1 | -1 | -1 | -1 | -1 | 0 |
|---|---|---|----|----|----|----|---|

And lower register 27 contains after 8 chip times t1 the sequence

| 0 | 0 | 0 | 0 | 0 | 0 | 0 | 1 |
|---|---|---|---|---|---|---|---|

FIG. 19A shows a tabular depiction of the results of correlations between the received Walsh sequence W(3,2) of time shift t1 and the created Golay-Walsh sequence AW(3,2) together with the respective results of correlations of complementary W(3,2)' and AW(3,2)' sequences as well as the results of correlations of the corresponding reversed sequences as explained with reference to FIG. 18. The last row of FIG. 19A shows the perfect correlation signal of zero for the case of asynchronous transmission. The time shifted Walsh sequence is thus discarded and not wrongly recognized as a useful signal.

Figure 19B:
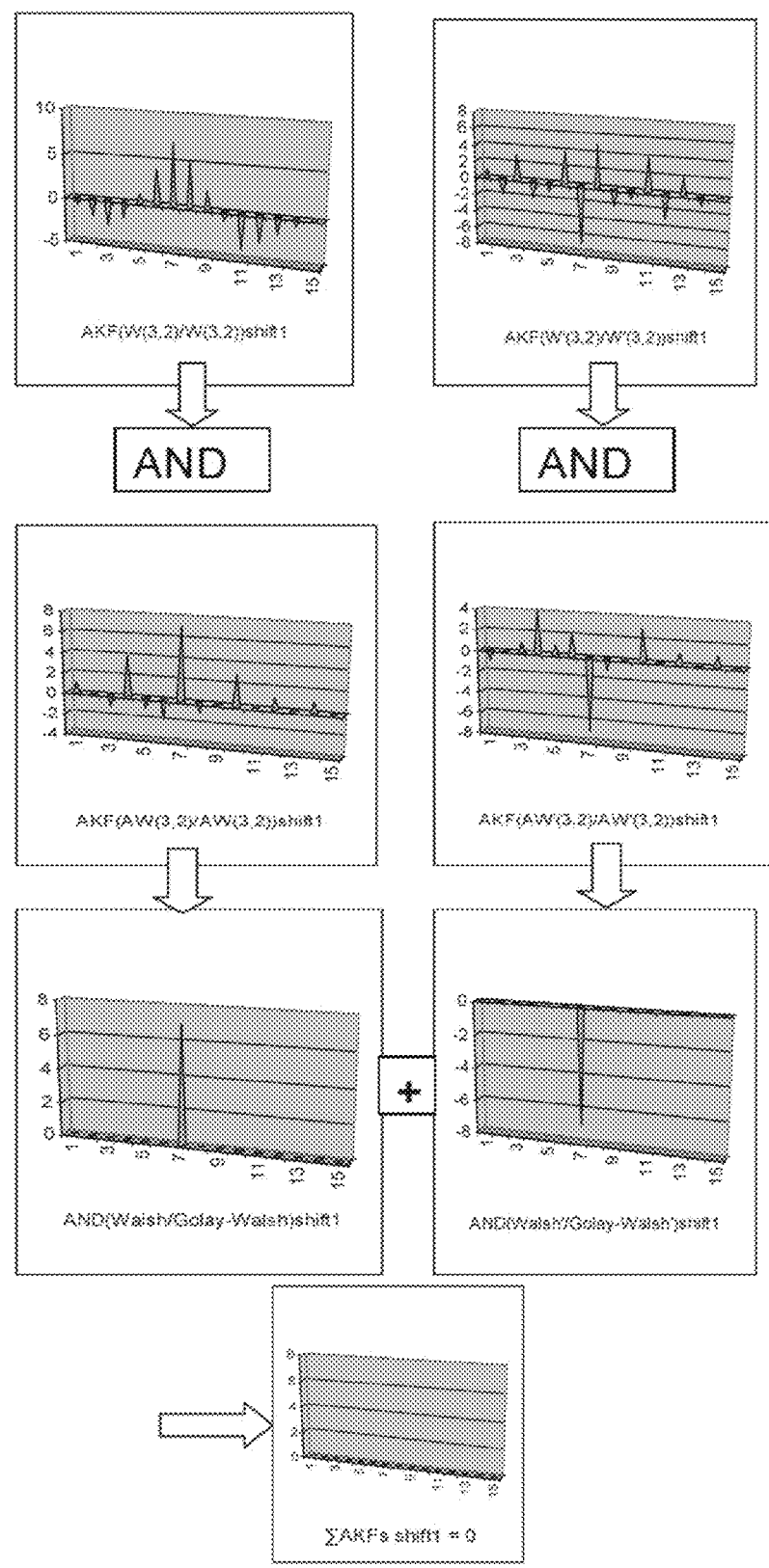
FIG. 19B illustrates graphically the correlation results of FIG. 19A obtained by the calculation steps 110a, 111a of FIG. 18B for a Walsh sequence shifted by one chip time t1. The invention has shown that correlation results of zero are also achieved with higher time shifts.

FIG. 19B illustrates graphically the correlation results of FIG. 19A obtained by the calculation steps 110*a*, 111*a* of FIG. 18B for a Walsh sequence shifted by one chip time t1.

The invention has shown that correlation results of zero are also achieved with higher time shifts.

Figure 19C:
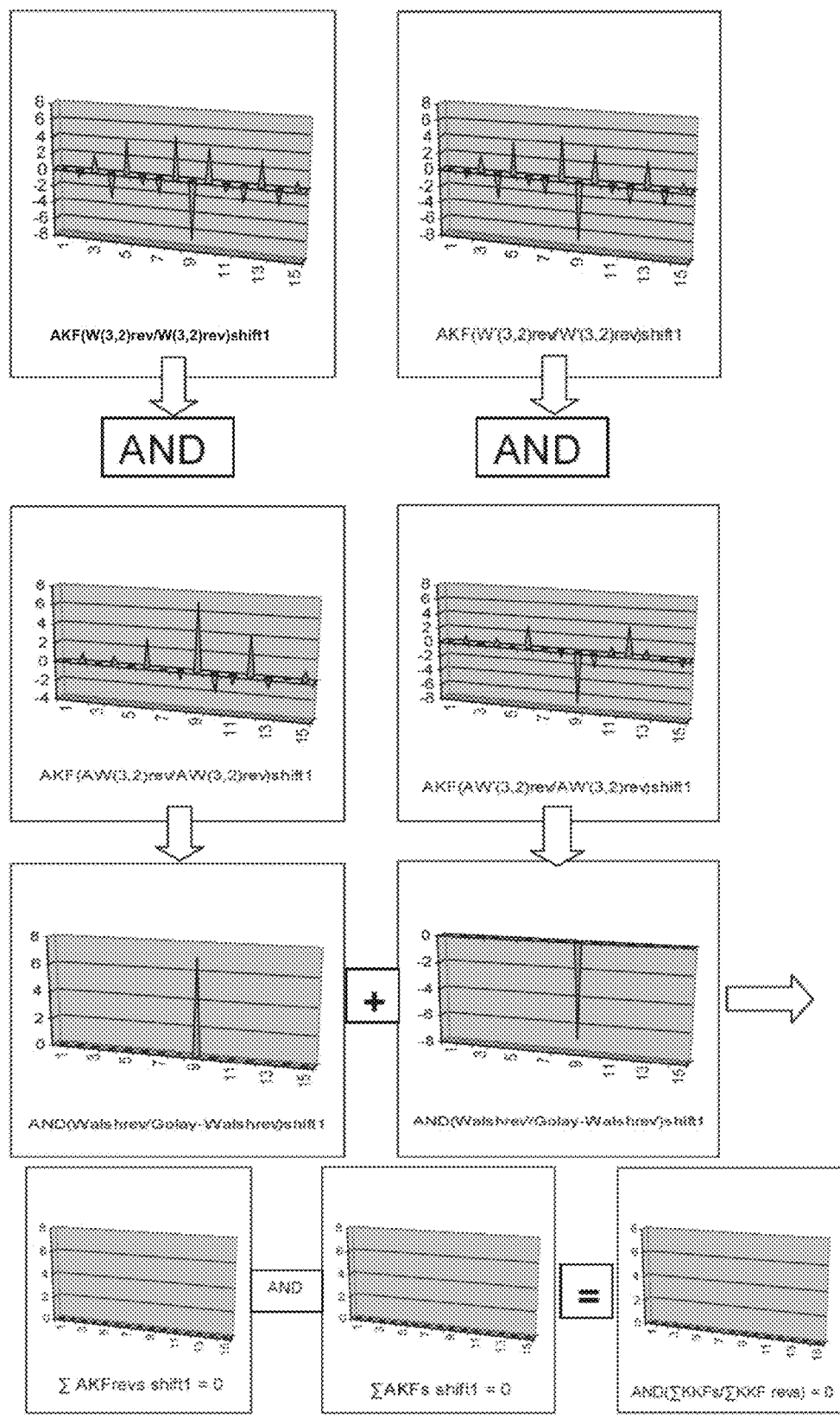
FIG. 19C illustrates graphically the correlation results of FIG. 19A obtained by the calculation steps 112a, 113a and 114a of FIG. 18B, according to an embodiment.

FIG. 19C illustrates graphically the correlation results of FIG. 19A obtained by the calculation steps 112*a*, 113*a* and 114*a* of FIG. 18B.

Figure 20A:
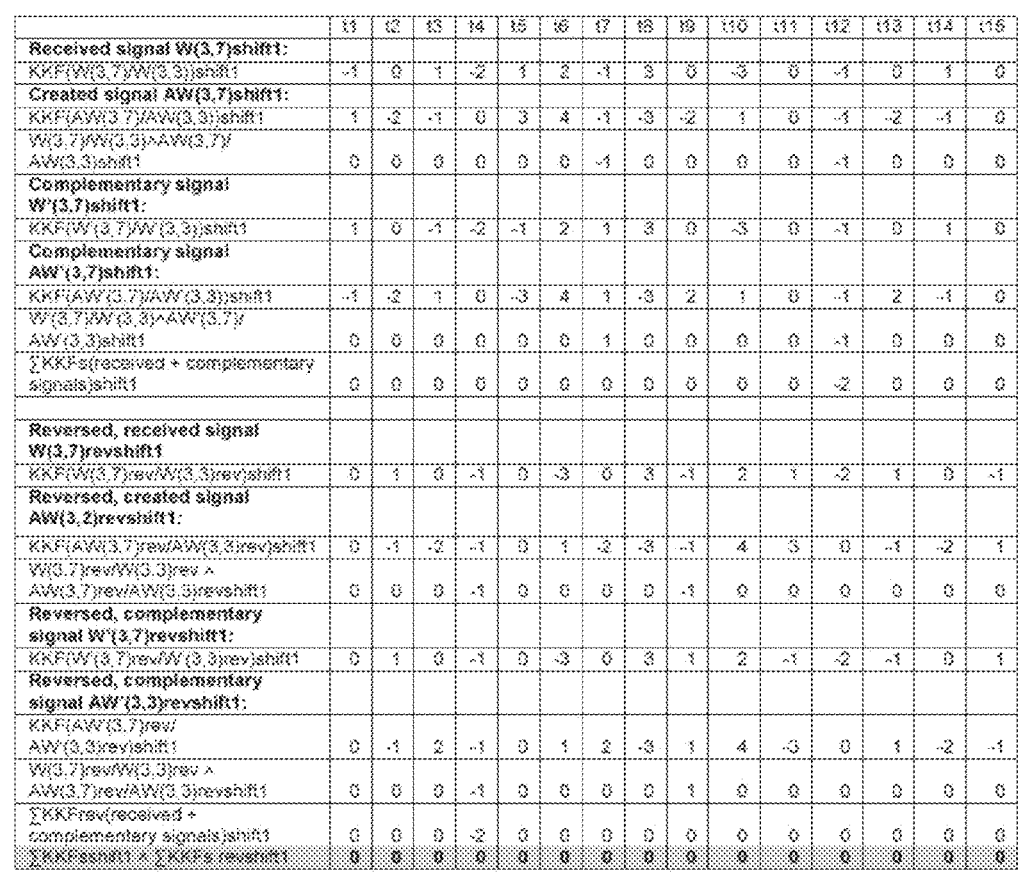

FIG. 20A shows a tabular depiction of the results of cross-correlations between the received Walsh code sequence W(3,7) of time shift t1 and the Walsh sequence W(3,3) and the results of cross-correlations with the corresponding Golay-Walsh code sequence AW(3,3), the complementary W(3,3)' and AW(3,3)', and reversed results of cross-correlations with the W(3,3) and AW(3,3) sequences as explained with reference to—FIG. 18. The last row of FIG. 20A shows the perfect cross correlation result of zero for the case of asynchronous transmission. The time shifted Walsh sequence is thus discarded and not wrongly recognized as a user signal. The invention has shown that correlations of zero are also achieved with higher time shifts.

Figure 20B:
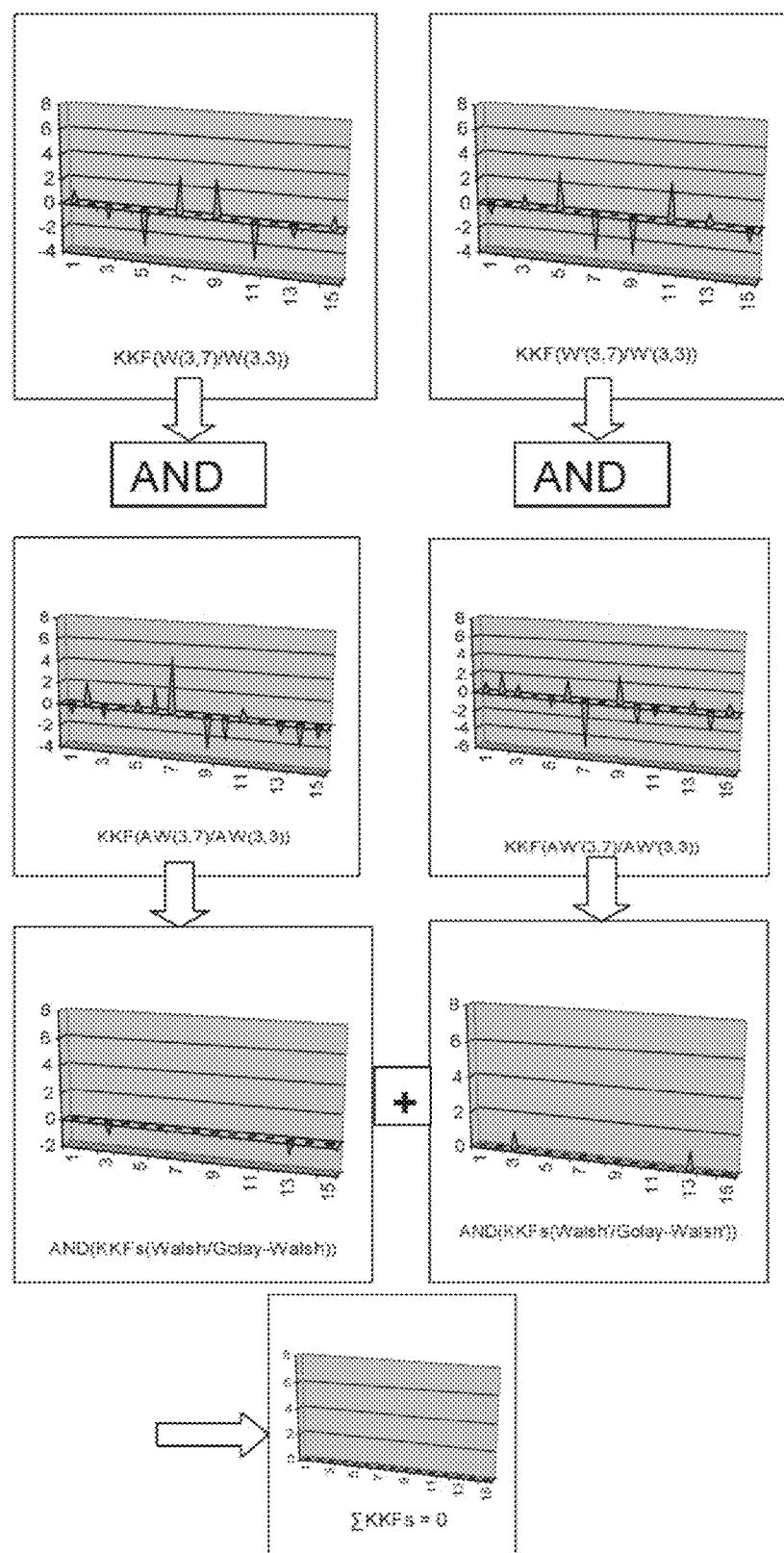
FIG. 20B illustrates graphically the correlation results of FIG. 20A obtained by the calculation steps 110a, 111a of FIG. 18B.

FIG. 20B illustrates graphically the correlation results of FIG. 20A obtained by the calculation steps 110*a*, 111*a* of FIG. 18B. The invention has shown that correlations of zero are also achieved with higher time shifts.

Figure 20C:
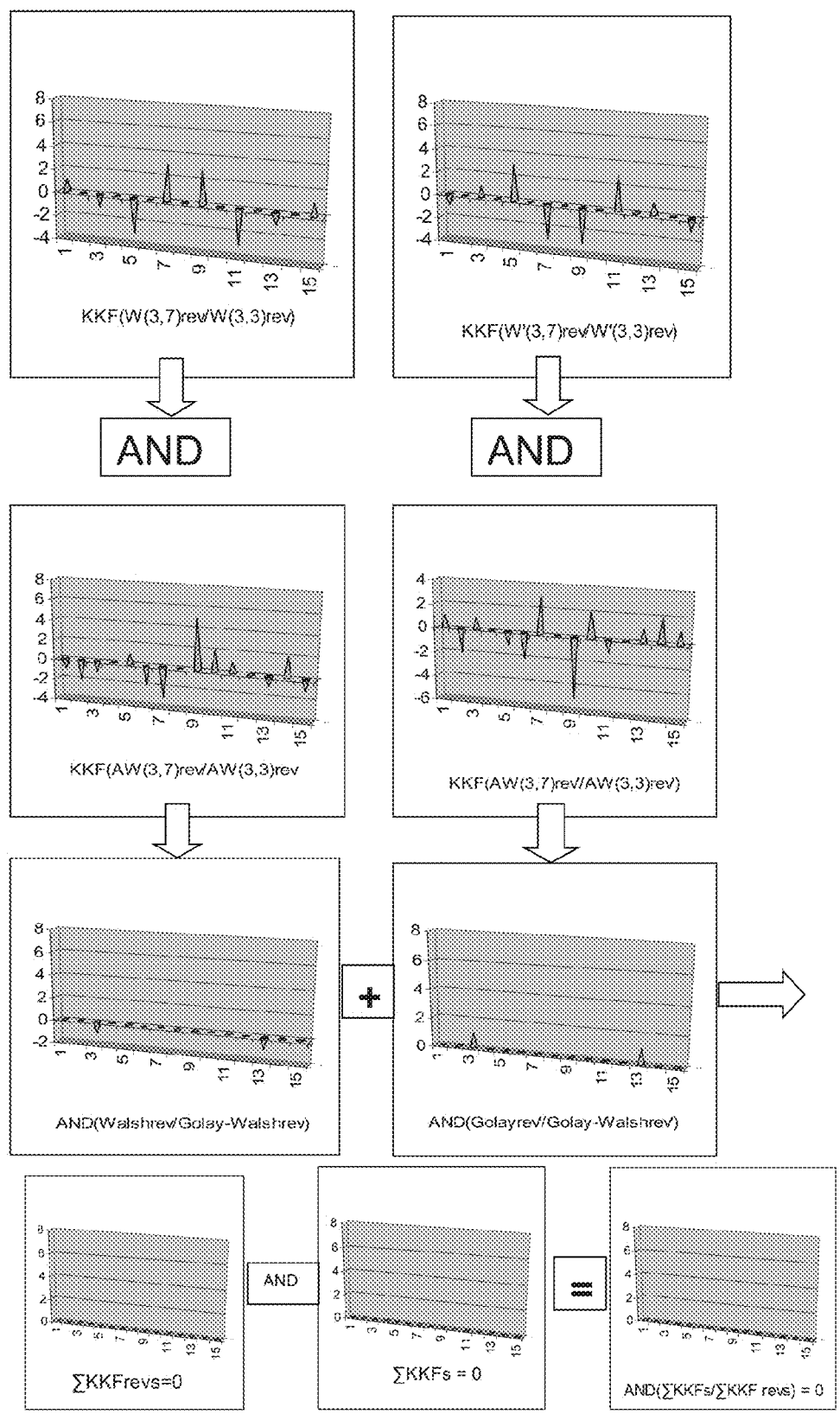
FIG. 20C illustrates graphically the correlation results of FIG. 20A obtained by the calculation steps 112a, 113a and 114a of FIG. 18B.

FIG. 20C illustrates graphically the correlation results of FIG. 20A obtained by the calculation steps 112*a*, 113*a* and 114*a* of FIG. 18B.

The invention has proven by mathematical simulation that disturbing side lobes are effectively suppressed by the above described method in any asynchronous, time shifted case. Side lobes occasionally occurring at time shifts N/2+−1 are further suppressed by the symmetry test described above. Optimal decoding results are obtained when the Walsh sequences in the data stream are separated by groups of zero's.

The invention has recognized that such disturbing side lobes can be eliminated by exploiting symmetry characteristics of the Walsh and Golay-Walsh sequences. The disclosed method is therefore truly super-orthogonal.

The super-orthogonal method described above provides the following advantages:

The improved symmetry test is based on simplified equations 9a and 9b which are applied early in the decoding process for reduced processing time.

By providing early AND conjunctions according to steps 110*a* and 112*a* of FIG. 18B as implemented in the modified correlation modules 23*a*, 23*b* and 28*a*, 28*b* for Walsh- and Golay-Walsh sequences the invention has shown that optimal decoding results are obtained also for asynchronous reception by eliminating disturbing side lobes in cross correlations while clearly distinguished output signals are obtained for the auto correlation of the received user signal.

In autocorrelation the disclosed detection method detects the correct sequence without any side lobes only if the sequence arrives at zero time shift and with full mid-peak signal that can easily detected. All other correlations of time shifted sequences are zero or rejected already by the symmetry test. So the improved conjunction test removes the few side lobes remaining after the application of the symmetry test.

The disclosed method of using an aperiodic data stream, e.g. by substituting guard intervals in the receiver, enables to instantly establish synchronization with the first arriving data signal without assuming an initial synchronization clock pulse as described earlier in relation to step 102 of FIG. 1. This will accelerate the start of the communication process since the initialization procedure can omit an upfront synchronization code—the method is thereby perfectly adapted to the current all-IP data packets transmission type.

On the other hand it has been found that a split interval of only four embedded zero chips will be sufficient for establishing an aperiodic data stream so that the decision module is further accelerated.

In the case of synchronous transmission most of the disturbing side lobes are also eliminated by providing the early AND conjunctions for the correlations in steps 110a and 112a.

A further advantage of the improved AND conjunction test is that it enables even the use of the sequences W(n,1), namely a constant, as perfect signature sequences. The problem related to sequences W(n,1) described above in the section Symmetry Test is thereby removed, namely that that after applying the symmetry test disturbing side lobes are still present that prohibit the use of the such sequences.

In other words, the use of the symmetry test alone would not have allowed the W(n,1) sequences; only the combination with the improved conjunction test provides the complete perfect super-orthogonal decoding method. A complete set of Walsh sequences can now be used.

The invention claimed is:

1. A method for de-spreading data signals (DS) that have been spread using a Walsh sequence (W(n,m)) of the chip lengths N, which are received as the first data stream in a periodic sequence, wherein the method comprises:
    splitting the first data stream into at least a second and a third non-periodic data stream, each of which comprises alternating N successive chips of the first data stream arriving with a chip cycle;
    with each chip cycle, computing a correlation of the lengths N for each chip sequence in the second and in the third data streams with stored sequences;
    determining desired signals using the second and third data streams by calculating the respective maximums of the computed correlations within 2N−1 chip cycles, and evaluating the symmetry of the calculated maximums with a threshold value;
    wherein determining the desired signal comprises checking the condition:

(ABS($a+b$)−ABS($a−b$))+ABS(main maximum)>$T$, and wherein:
    ABS=absolute value,
    T=predetermined threshold value,
    Main maximum=maximum value of the calculated correlations within 2N−1 chip cycles,
    a=sum of all correlation maximums within N−1 chip cycles that precede the main maximum, and
    b=sum of all correlation maximums within N−1 chip cycles that follow the main maximum; and
    joining the determined desired signals in an alternating manner, in each case following N chip cycles, for generating the de-spread first data stream.

2. The method according to claim 1, wherein the threshold is T=4N and the method further comprises:
    a) forming a time-reversed spread data signal ($DS_{Rev}$) from the spread data signal (DS);
    b) forming a complementary spread data signal (DS') from the spread data signal (DS) through alternating multiplication of the chips of the spread data signal (DS) with +1 and −1, and a time-reversed complementary spread data signal ($DS_{Rev}$') from the time-reversed data signal through alternating multiplication of the chip of the time-reversed spread data signal with +1 and −1;
    c) correlating the spread data signal (DS) with a Walsh sequence (W(n,m)), the time-reversed spread data signal ($DS_{Rev}$) with a time-reversed Walsh sequence (W(n,m)$_{Rev}$), the complementary spread data signal (DS') with a complementary Walsh sequence (W(n,m)'), and the time-reversed complementary spread data signal ($DS_{Rev}$') with a time-reversed complementary Walsh sequence (W(n,m)$_{Rev}$');
    d) determining the maximums of the correlations calculated in step c).

3. The method according to claim 2, in which the step for computing the correlation comprises:
    d) adding the four correlations from step c);
    e) forming a converted spread data signal (DAW) through multiplication of the spread data signal (DS) with a Golay-Walsh sequence (AW(n,m));
    f) forming a time-reversed converted spread data signal ($DAW_{Rev}$);
    g) forming a complementary converted spread data signal (DAW') from the spread converted data signal (DAW), and a time-reversed complementary converted spread data signal ($DAW_{Rev}$') from the time-reversed converted spread data signal ($DAW_{Rev}$), through alternating multiplication of the chip sequence with +1 and −1;
    h) correlating the converted spread data signal (DAW) with a Golay-Walsh sequence (AW), the time-reversed converted spread data signal ($DAW_{Rev}$) with a time-reversed Golay-Walsh sequence ($AW_{Rev}$), the complementary converted spread data signal (DAW') with a complementary Golay-Walsh sequence (AW'), and the time-reversed complementary converted spread data signal ($DAW_{Rev}$) with a time-reversed complementary Golay-Walsh sequence ($AW_{Rev}$');
    i) adding of the four correlations from step h); and
    j) linking the sums from step d) and step i) through logical AND conjunction.

4. The method according to claim 1, wherein the threshold is T=N and the method further comprises:
    a) forming a complementary spread data signal (DS') from the spread data signal (DS) through alternating multiplication of the chips of the spread data signal (DS) with +1 and −1, and a time-reversed complementary spread data signal ($DS_{Rev}$') from the time-reversed data signal through alternating multiplication of the chip of the time-reversed spread data signal with +1 and −1;
    b) calculating at least one of the correlation of the spread data signal (DS) with a Walsh sequence (W(n,m)) and the correlation of the complementary spread data signal (DS') with a complementary Walsh sequence (W(n,m)');
    c) determining the maximums of the correlations calculated in step b).

5. The method according to claim 4, wherein the first data stream is a continuous aperiodic data stream with Walsh sequences W(n,m) separated by groups of Z chips with zeros, Z being either $2^n$ or ½ $2^n$ and n>=2.

6. The method according to claim 4, in which the step for computing the correlation comprises:
    d) adding the four correlations from step c);
    e) forming a converted spread data signal (DAW) through multiplication of the spread data signal (DS) with a Golay-Walsh sequence (AW(n,m));
    f) forming a time-reversed converted spread data signal ($DAW_{Rev}$);

g) forming a complementary converted spread data signal (DAW') from the spread converted data signal (DAW), and a time-reversed complementary converted spread data signal ($DAW_{Rev}$') from the time-reversed converted spread data signal ($DAW_{Rev}$), through alternating multiplication of the chip sequence with +1 and −1;

h) correlating the converted spread data signal (DAW) with a Golay-Walsh sequence (AW), the time-reversed converted spread data signal ($DAW_{Rev}$) with a time-reversed Golay-Walsh sequence ($AW_{Rev}$), the complementary converted spread data signal (DAW') with a complementary Golay-Walsh sequence (AW'), and the time-reversed complementary converted spread data signal ($DAW_{Rev}$') with a time-reversed complementary Golay-Walsh sequence ($AW_{Rev}$');

i) adding of the four correlations from step h); and j) linking the sums from step d) and step i) through logical AND conjunction.

7. A method for de-spreading data signals (DS) that have been spread using a Walsh sequence (W(n,m)) of the chip lengths N=$2^n$, which are received as the first data stream in a periodic sequence, wherein the method comprises:

splitting the first data stream into at least a second and a third non-periodic data stream, each of which comprises alternating N successive chips of the first data stream arriving with a chip cycle;

with each chip cycle, computing a correlation of the lengths N for each chip sequence in the second and in the third data streams with stored sequences;

determining desired signals using the second and third data streams by evaluating the symmetry of the calculated correlations; and joining the determined desired signals in an alternating manner, in each case following N chip cycles, for generating the de-spread first data stream, wherein the computing of correlations comprises:

a) forming a complementary spread data signal (DS') from the spread data signal (DS) through alternating multiplication of the chips of the spread data signal (DS) with +1 and −1;

b) forming a time-reversed spread data signal ($DS_{Rev}$) from the spread data signal (DS);

c) forming a time-reversed complementary spread data signal ($DS_{Rev}$') from the time-reversed data signal through alternating multiplication of the chip of the time-reversed spread data signal with +1 and −1;

d) forming a converted spread data signal (DAW) through multiplication of the spread data signal (DS) with a Golay-Walsh sequence (AW(n,m));

e) forming a time-reversed converted spread data signal ($DAW_{Rev}$);

f) forming a complementary converted spread data signal (DAW') from the spread converted data signal (DAW), and a time-reversed complementary converted spread data signal ($DAW_{Rev}$') from the time-reversed converted spread data signal ($DAW_{Rev}$), through alternating multiplication of the chip sequence with +1 and −1;

g) correlating the spread data signal (DS) with a Walsh sequence (W(n,m));

h) correlating the converted spread data signal (DAW) with a Golay-Walsh sequence (AW(n,m));

i) forming the logical conjunction AND between the correlations calculated in steps g) and h);

j) correlating the complementary spread data signal (DS') with a complementary Walsh sequence (W(n,m)');

k) correlating the complementary converted spread data signal (DAW') with a complementary Golay-Walsh sequence (AW(n,m)');

l) forming the logical conjunction AND between the correlations calculated in steps j) and k);

m) summing the logical conjunctions calculated in steps i) and l);

n) correlating the time-reversed spread data signal ($DS_{Rev}$) with a time-reversed Walsh sequence (W(n,m)$_{Rev}$);

o) correlating the time-reversed converted spread data signal ($DAW_{Rev}$) with a time-reversed Golay-Walsh sequence (AW(n,m)$_{Rev}$);

p) forming the logical conjunction AND between the correlations calculated in steps n) and o);

q) correlating the time-reversed spread data signal ($DS_{Rev}$) with a time-reversed Walsh sequence (W(n,m)$_{Rev}$);

r) correlating the time-reversed complementary converted spread data signal ($DAW_{Rev}$) with a time-reversed complementary Golay-Walsh sequence (AW(n,m)$_{Rev}$');

s) forming the logical conjunction AND between the correlations calculated in steps q) and r);

t) adding the logical conjunctions formed in steps p) and s); and u) linking the sums calculated in step m) and step t) through logical AND conjunction.

8. The method according to claim 7, wherein determining the desired signal comprises checking the condition:

$$(ABS(a+b)-ABS(a-b))+ABS(\text{main maximum})>N,$$

and wherein:

ABS=absolute value,

Main maximum=maximum value of the calculated correlations within 2N−1 chip cycles, a=sum of all correlation maximums within N−1 chip cycles that precede the main maximum, and b=sum of all correlation maximums within N−1 chip cycles that follow the main maximum, the method further comprising:

a) forming a complementary spread data signal (DS') from the spread data signal (DS) through alternating multiplication of the chips of the spread data signal (DS) with +1 and −1, and a time-reversed complementary spread data signal ($DS_{Rev}$') from the time-reversed data signal through alternating multiplication of the chip of the time-reversed spread data signal with +1 and −1;

b) calculating at least one of the correlation of the spread data signal (DS) with a Walsh sequence (W(n,m)) and the correlation of the complementary spread data signal (DS') with a complementary Walsh sequence (W(n,m)'); and c) determining the maximums of the correlations calculated in step b).

9. The method according to claim 7, wherein the first data stream is a continuous aperiodic data stream with Walsh sequences W(n,m) separated by groups of Z chips with zeros, Z being either $2^n$ or ½ $2^n$ and n>=2.

10. A decoder for de-spreading a data signal (DS) that have been spread using a Walsh sequence (W(n,m)) of the chip lengths N, which are received as a first data stream in a periodic sequence, wherein the decoder comprises:

means for splitting the first data stream into at least a second and a third non-periodic data stream, each of which records alternating N successive chips of the first data stream arriving with a chip cycle;

means for computing the correlation of the lengths N for each chip sequence in the second and third data streams with stored sequences, at each chip cycle;

means for determining desired signals using the second and third data streams by calculating the respective maximums of the computed correlations within 2N−1 chip cycles, and evaluating the symmetry of the calculated maximums with a threshold value;

wherein the means for determining the desired signal each contain:

storage means for storing the correlation values computed for successive 2N−1 chip cycles of the data stream assigned thereto; and comparison means adapted to check the condition:

(ABS($a+b$)−ABS($a−b$))+ABS(main maximum)>$T$, wherein:

ABS=absolute value,

T=predetermined value,

Main maximum=maximum value of the calculated correlation within 2N 1 chip cycles, a=sum of all correlation maximums within N−1 chip cycles that precede the main maximum, and b=sum of all correlation maximums within N−1 chip cycles that follow the main maximum, and means for joining the determined desired signals in an alternating manner, in each case following N chip cycles, for generating the de-spread first data stream.

11. The decoder according to claim 10, wherein the means for splitting the first data stream contains an impulse generator synchronized with the chip cycle, and two downstream, alternately activated shift registers of the length N.

12. The decoder according to claim 10, in which the means for computing the correlations contain:

means for branching the spread data signal (DS);

means for storing at least two branched spread data signal (DS);

means for forming and storing complementary spread data signal (DS') from the spread data signal (DS);

means for reading the stored spread data signals (DS, DS'), wherein one spread data signal (DS) and one complementary spread data signal (DS') are read out as time-reversed spread data signals ($DS_{Rev}$, $DS_{Rev}$');

first correlation means (KF1, KF2, KF3, KF4) for correlating the spread data signal (DS) with the spread sequence (W(n,m)), the time-reversed spread data signal ($DS_{Rev}$) with a time-reversed spread sequence (W(n,m)$_{Rev}$), the complementary spread data signal (DS') with a complementary spread sequence (W(n,m)'), and the time-reversed complementary spread data signal ($DS_{Rev}$') with a time-reversed complementary spread sequence (W(n,m)$_{Rev}$');

means for adding the four correlations of the first correlation means;

means for forming a converted spread data signal (DAW) by multiplying the spread data signal (DS) with a Golay-Walsh sequence (AW(n,m));

means for forming a time-reversed converted spread data signal ($DAW_{Rev}$);

means for forming a complementary converted spread data signal (DAW') from the spread converted data signal (DAW), and a time-reversed complementary converted spread data signal ($DAW_{Rev}$') from the time-reversed converted spread data signal ($DAW_{Rev}$) through alternating multiplication of the chip sequence with +1 and −1;

second correlation means (KF5, KF6, KF7, KF8) for correlating a converted spread data signal (DAW) with a Golay-Walsh sequence (AW), a time-reversed converted spread data signal ($DAW_{Rev}$) with the a reversed Golay-Walsh sequence ($AW_{Rev}$), the complementary converted spread data signal (DAW') with a complementary Golay-Walsh sequence (AW'), and the time-reversed complementary converted spread data signal ($DAW_{Rev}$') with a time-reversed complementary Golay-Walsh sequence ($AW_{Rev}$');

means for adding the four correlations of the second correlation means; and means for linking the sums of the first correlation means and the sums of the second correlation means through logical AND conjunction.

13. The decoder according to claim 10, wherein the means for joining contain:

a switch connected to the means for determining the desired signal, synchronized with the N multiples of the chip cycles, and a shift register connected to the switch.

14. The decoder according to claim 10, wherein the comparison means is adapted to check the condition T=4N and the decoder comprises:

means for forming a time-reversed spread data signal ($DS_{Rev}$) from the spread data signal (DS);

means for forming a complementary spread data signal (DS') from the spread data signal (DS) through alternating multiplication of the chips of the spread data signal (DS) with +1 and −1, and a time-reversed complementary spread data signal ($DS_{Rev}$') from the time-reversed data signal through alternating multiplication of the chip of the time-reversed spread data signal with +1 and −1;

means for correlating the spread data signal (DS) with a Walsh sequence (W(n,m)), the time-reversed spread data signal ($DS_{Rev}$) with a time-reversed Walsh sequence (W(n,m)$_{Rev}$), the complementary spread data signal (DS') with a complementary Walsh sequence (W(n,m)'), and the time-reversed complementary spread data signal ($DS_{Rev}$') with a time-reversed complementary Walsh sequence (W(n,m)$_{Rev}$'); and means for determining the maximums of the calculated correlations.

15. The decoder according to claim 10, wherein the comparison means adapted to check the condition T=N and the decoder comprises:

means for forming a complementary spread data signal (DS') from the spread data signal (DS) through alternating multiplication of the chips of the spread data signal (DS) with +1 and −1, and a time-reversed complementary spread data signal ($DS_{Rev}$') from the time-reversed data signal through alternating multiplication of the chip of the time-reversed spread data signal with +1 and −1;

means for calculating at least one of the correlation of the spread data signal (DS) with a Walsh sequence (W(n, m)) and the correlation of the complementary spread data signal (DS') with a the complementary Walsh sequence (W(n,m)'); and means for determining the maximums of the at least one calculated correlation.

16. A system for digital communication having spread modulation, which comprises a transmitter-side encoder for spreading data signals using Walsh sequences (W(n,m)) and a receiver-side decoder according to claim 10.

17. The system according to claim 16, wherein the first data stream is a continuous aperiodic data stream with Walsh sequences W(n,m) separated by groups of Z chips with zeros, Z being either $2^n$ or $\frac{1}{2} 2^n$ and n>=2.

18. The system according to claim 17, wherein the group of Z zeros is generated by the receiver-side decoder from guard band chips in the received data stream.

19. A decoder for de-spreading a data signal (DS) that have been spread using a Walsh sequence (W(n,m)) of the chip lengths N, which are received as a first data stream in a periodic sequence, wherein the decoder comprises:
   means for splitting the first data stream into at least a second and a third non-periodic data stream, each of which records alternating N successive chips of the first data stream arriving with a chip cycle;
   means for computing the correlation of the lengths N for each chip sequence in the second and third data streams with stored sequences, at each chip cycle;
   means for determining desired signals using the second and third data streams by calculating the respective correlations within 2N−1 chip cycles, and evaluating the symmetry of the correlations; and
   means for joining the determined desired signals in an alternating manner, in each case following N chip cycles, for generating the de-spread first data stream;
   wherein the means for computing the correlations comprise:
   a) means for forming a complementary spread data signal (DS') from the spread data signal (DS) through alternating multiplication of the chips of the spread data signal (DS) with +1 and −1;
   b) means for forming a time-reversed spread data signal ($DS_{Rev}$) from the spread data signal (DS);
   c) means for forming a time-reversed complementary spread data signal ($DS_{Rev}$') from the time-reversed data signal through alternating multiplication of the chip of the time-reversed spread data signal with +1 and −1;
   d) means for forming a converted spread data signal (DAW) through multiplication of the spread data signal (DS) with a Golay-Walsh sequence (AW(n,m));
   e) means for forming a time-reversed converted spread data signal ($DAW_{Rev}$);
   f) means for forming a complementary converted spread data signal (DAW') from the spread converted data signal (DAW), and a time-reversed complementary converted spread data signal ($DAW_{Rev}$') from the time-reversed converted spread data signal ($DAW_{Rev}$), through alternating multiplication of the chip sequence with +1 and −1;
   g) means for correlating the spread data signal (DS) with a Walsh sequence (W(n,m));
   h) means for correlating the converted spread data signal (DAW) with a Golay-Walsh sequence (AW(n,m));
   i) means for forming the logical conjunction AND between the correlations calculated by means g) and means h);
   j) means for correlating the complementary spread data signal (DS') with a complementary Walsh sequence (W(n,m)');
   k) means for correlating the complementary converted spread data signal (DAW') with a complementary Golay-Walsh sequence (AW(n,m)');
   l) means for forming the logical conjunction AND between the correlations calculated by means j) and means k);
   m) means for summing the logical conjunctions calculated by means i) and means l);
   n) means for correlating the time-reversed spread data signal ($DS_{Rev}$) with a time-reversed Walsh sequence ($W(n,m)_{Rev}$);
   o) means for correlating the time-reversed converted spread data signal ($DAW_{Rev}$) with a time-reversed Golay-Walsh sequence ($AW(n,m)_{Rev}$);
   p) means for forming the logical conjunction AND between the correlations calculated by means n) and means o);
   q) means for correlating the time-reversed spread data signal ($DS_{Rev}$) with a time-reversed Walsh sequence ($W(n,m)_{Rev}$);
   r) means for correlating the time-reversed complementary converted spread data signal ($DAW_{Rev}$') with a time-reversed complementary Golay-Walsh sequence ($AW(n,m)_{Rev}$');
   s) means for forming the logical conjunction AND between the correlations calculated by means q) and means r);
   t) means for summing the logical conjunctions formed by means p) and means s); and
   u) means for linking the sums calculated by means m) and means t) through logical AND conjunction.

20. The decoder according to claim 19, wherein the first data stream is a continuous aperiodic data stream with Walsh sequences W(n,m) separated by groups of Z chips of zeros, Z being either $2^n$ or $\frac{1}{2} 2^n$ and n>=2.

21. The decoder according to claim 19, wherein the means for determining the desired signal each contain:
   storage means for storing the correlation values computed for successive 2N−1 chip cycles of the data stream assigned thereto; and
   comparison means adapted to check the condition:

$$(ABS(a+b)-ABS(a-b))+ABS(\text{main maximum})>N,$$

wherein:
   ABS=absolute value,
   Main maximum=maximum value of the calculated correlation within 2N−1 chip cycles,
   a=sum of all correlation maximums within N−1 chip cycles that precede the main maximum, and
   b=sum of all correlation maximums within N−1 chip cycles that follow the main maximum,
   the decoder further comprising:
   means for forming a complementary spread data signal (DS') from the spread data signal (DS) through alternating multiplication of the chips of the spread data signal (DS) with +1 and −1, and a time-reversed complementary spread data signal ($DS_{Rev}$') from the time-reversed data signal through alternating multiplication of the chip of the time-reversed spread data signal with +1 and −1;
   means for calculating at least one of the correlation of the spread data signal (DS) with a Walsh sequence (W(n,m)) and the correlation of the complementary spread data signal (DS') with a complementary Walsh sequence (W(n,m)'); and
   means for determining the maximums of the at least one calculated correlation.

\* \* \* \* \*